US007486286B2

(12) United States Patent
Kim et al.

(10) Patent No.: US 7,486,286 B2
(45) Date of Patent: Feb. 3, 2009

(54) CAPACITIVE LOAD CHARGE-DISCHARGE DEVICE AND LIQUID CRYSTAL DISPLAY DEVICE HAVING THE SAME

(75) Inventors: Jinoh Kim, Suzuka (JP); Katsutoshi Kobayashi, Ise (JP)

(73) Assignee: Sharp Kabushiki Kaisha, Osaka (JP)

( * ) Notice: Subject to any disclaimer, the term of this patent is extended or adjusted under 35 U.S.C. 154(b) by 683 days.

(21) Appl. No.: 11/190,814

(22) Filed: Jul. 28, 2005

(65) Prior Publication Data

US 2006/0022928 A1 Feb. 2, 2006

(30) Foreign Application Priority Data

Jul. 29, 2004 (JP) ............................ 2004-222530
Jun. 27, 2005 (JP) ............................ 2005-187211

(51) Int. Cl.
*G06F 3/038* (2006.01)

(52) U.S. Cl. .......................... 345/204; 345/87; 345/99; 315/169.1

(58) Field of Classification Search .......... 345/87-100, 345/204; 315/169.1-169.4
See application file for complete search history.

(56) References Cited

U.S. PATENT DOCUMENTS

| | | | | |
|---|---|---|---|---|
| 7,403,183 | B2 * | 7/2008 | Someya | 345/98 |
| 7,414,601 | B2 * | 8/2008 | Yoo | 345/87 |
| 2001/0009518 | A1 * | 7/2001 | Foss et al. | 363/60 |
| 2001/0020840 | A1 * | 9/2001 | Kojima | 323/282 |
| 2001/0022573 | A1 * | 9/2001 | Sasaki et al. | 345/100 |
| 2002/0080133 | A1 | 6/2002 | Eu | |
| 2003/0058235 | A1 | 3/2003 | Moon | |
| 2003/0227429 | A1 | 12/2003 | Shimoshikiryo | |
| 2004/0036456 | A1 * | 2/2004 | Foss et al. | 323/274 |
| 2004/0113880 | A1 * | 6/2004 | Honda | 345/96 |
| 2004/0125096 | A1 * | 7/2004 | Kigo et al. | 345/204 |
| 2005/0122441 | A1 | 6/2005 | Shimoshikiryoh | |

(Continued)

FOREIGN PATENT DOCUMENTS

| | | |
|---|---|---|
| CN | 1420483 | 5/2003 |

(Continued)

*Primary Examiner*—Richard Hjerpe
*Assistant Examiner*—Kimnhung Nguyen
(74) *Attorney, Agent, or Firm*—Harness, Dickey & Pierce, P.L.C.

(57) ABSTRACT

A pixel charge-discharge circuit charges and discharges a series circuit of a capacitor by alternately connecting two types of auxiliary capacitance wires to a high voltage source and a low voltage source by using four types of switches. The high voltage source and the low voltage source are positive voltage sources, and a potential of the high voltage source is greater than that of the low voltage source. The low voltage source serving as a sink-current-flowing voltage source includes a stored energy adjustment section. The stored energy adjustment section discharges electrostatic energy from the high voltage source by turning ON and OFF two types of switches and causes the electrostatic energy to be balanced by energy supplied from the series circuit. In this way, a capacitive load charge-discharge device can be achieved which uses homopolar voltage sources as both a high voltage source and a low voltage source and is capable of stabilizing a constant voltage function of each of the voltage sources, while generating less heat, when a capacitive load is charged and discharged by alternately reversing the direction of a current.

11 Claims, 21 Drawing Sheets

U.S. PATENT DOCUMENTS

| | | | | |
|---|---|---|---|---|
| 2005/0190168 | A1* | 9/2005 | Jiang et al. | 345/204 |
| 2006/0164404 | A1* | 7/2006 | Maone et al. | 345/204 |
| 2006/0274006 | A1 | 12/2006 | Moon | |

FOREIGN PATENT DOCUMENTS

| | | |
|---|---|---|
| JP | 2983787 | 9/1999 |
| JP | 2004-062146 | 2/2004 |
| JP | 2005-189804 | 7/2005 |
| KR | 2002-0050809 | 6/2002 |
| TW | 533399 | 5/2003 |
| TW | 571276 | 1/2004 |

* cited by examiner

Vs
COMMON
Ground

Vcsa
Vad
COMMON
Ground
T3
T4
T5

Vcsb
Vad
COMMON
Ground
T1
T2

VgH
Vg
COMMON
Ground
VgL

Vd
Vlca
COMMON
Ground

Vd
Vlcb
COMMON
Ground

CAPACITIVE LOAD CHARGE-DISCHARGE DEVICE AND LIQUID CRYSTAL DISPLAY DEVICE HAVING THE SAME

This Nonprovisional application claims priority under 35 U.S.C. § 119(a) on Patent Applications No. 222530/2004 filed in Japan on Jul. 29, 2004, and 187211/2005 filed in Japan on Jun. 27, 2005, the entire contents of which are hereby incorporated by reference.

FIELD OF THE INVENTION

The present invention relates to charging and discharging of pixels in a display device such as a liquid crystal display device and, more particularly, to charging and discharging of pixels in a multi-pixel driving liquid crystal display device capable of reducing viewing angle dependency of gamma characteristics in the liquid crystal display device.

BACKGROUND OF THE INVENTION

A liquid crystal display device is a flat-panel display device which has excellent characteristics including high resolution, small thickness, light weight, and low power consumption. Its market size has expanded recently with improvements in display performance and production capacity as well as improvements in price competitiveness against other types of display device.

A twisted nematic (TN) liquid crystal display device which has conventionally been in common use has liquid crystal molecules with positive dielectric anisotropy placed between upper and lower substrates in such a way that long axes of the liquid crystal molecules are oriented substantially parallel to substrate surfaces and twisted 90 degrees along a thickness direction of a liquid crystal layer. When a voltage is applied to the liquid crystal layer, the liquid crystal molecules rise parallel to the electric field, becoming free from the twisted alignment. The TN liquid crystal display device controls transmitted light quantity using rotary polarization changes resulting from orientation changes of the liquid crystal molecules by the voltage.

The TN liquid crystal display device allows wide manufacturing margins and high productivity. Meanwhile, it has problems with display performance, especially with viewing angle characteristics. Specifically, when a display surface of the TN liquid crystal display is viewed obliquely (Hereinafter, a state in which a display surface or an image is viewed obliquely is sometimes referred to as "oblique viewing state.", the display contrast ratio drops considerably. Consequently, even if an image clearly presents a plurality of gradations from black to white when viewed straight-on (Hereinafter, a state in which a display surface or an image is viewed straight-on is sometimes referred to as "straight-on viewing state."), luminance differences between gradations appear very unclear when the image is viewed obliquely. Besides, a phenomenon (so-called gradation reversal) that a portion which appears dark when viewed straight-on appears brighter when viewed obliquely also raises a problem.

In order to improve the viewing angle characteristics of the TN liquid crystal display device, some liquid crystal display devices have been developed recently, including an in-plane switching (IPS) liquid crystal display device, a multi-domain vertically aligned (MVA) liquid crystal display device, an axial symmetric micro-cell (ASM) display device, and other liquid crystal display devices.

A liquid crystal display device employing any one of the novel modes described above (wide viewing angle modes) solves the concrete problems with viewing angle characteristics. Specifically it is free of the problems that the display contrast ratio drops considerably or display gradations are reversed when the display surface of the TN liquid crystal display is viewed obliquely.

Today, however, under such circumstances that display quality of a liquid crystal display device continues to be improved, such a new problem with viewing angle characteristics has emerged that gamma characteristics in a straight-on viewing state differs from those in an oblique viewing state. That is, this is a problem associated with viewing angle dependency of gamma characteristics. Gamma characteristics mean gradation dependency of display luminance. The difference between gamma characteristics in a straight-on viewing state and those in an oblique viewing state means that a halftone display state differs depending on angles at which a display surface or an image is viewed. This makes problems especially in case of displaying images such as photographs or displaying television broadcasts and the like.

The viewing angle dependency of gamma characteristics is more prominent in the MVA mode and the ASM mode than in the IPS mode. Meanwhile, it is more difficult to produce an IPS panel which provides a high contrast ratio when viewed straight-on with high productivity than an MVA or ASM panel. Thus, it is desirable to reduce the viewing angle dependency of gamma characteristics especially in the MVA or ASM mode.

The inventors have proposed in Japanese Unexamined Patent Publication No. 62146/2004 (Tokukai 2004-62146; published on Feb. 26, 2004) a multi-pixel driving method as a method for reducing the viewing angle dependency of gamma characteristics. First, the multi-pixel driving method is described with reference to the figures.

The multi-pixel driving method is a technique which reduces the viewing angle characteristics (viewing angle dependency of gamma characteristics) by forming a single display pixel by using two or more sub-pixels having different luminance levels. First, a principle of the method will be briefly described.

FIG. 11 shows gamma characteristics (gradation (voltage)-luminance) of a liquid crystal display panel. A solid line of FIG. 11 represents gamma characteristics in a straight-on viewing state in a normal driving method (in which a single display pixel is not divided into a plurality of sub-pixels). In this case, the best viewability is achieved. Further, a dotted line of FIG. 11 represents gamma characteristics in an oblique viewing state in the normal driving method. In this case, there is a difference between gamma characteristics in a straight-on viewing state and those in an oblique viewing state, and the difference becomes small in a portion indicating a high or low luminance level and becomes large in a portion indicating a halftone luminance level.

In the multi-pixel driving method, for obtaining a target luminance level in the single display pixel, display control is performed so that an average luminance level of the plurality of sub-pixels having different luminance levels is the target luminance level. Moreover, as with the normal driving method, gamma characteristics in a straight-on viewing state in the multi-pixel driving method is set so that the best viewability is achieved. Meanwhile, setting of viewability in an oblique viewing state in the multi-pixel driving method is explained. For example, for obtaining a target halftone luminance level at which a luminance difference has conventionally been large, display is performed in that areas of the sub-pixels which are near the high and low luminance levels at which the luminance difference is small. Then, a halftone luminance level of the entire pixel is obtained from an average luminance level of the sub-pixels, so that the luminance difference becomes small. Thus, as represented by a dashed line in FIG. 11, gamma characteristics of a liquid crystal panel are obtained.

Next, FIG. 12 shows an example of an arrangement of a liquid crystal display device which performs multi-pixel driving. As shown in FIG. 12, a pixel 10 corresponding to a single display pixel is divided into sub-pixels 10*a* and 10*b*. The sub-pixel 10*a* has a sub-pixel electrode 18*a*, and the sub-pixel 10*b* has a sub-pixel electrode 18*b*. Connected to the sub-pixel 10*a* are a TFT (thin film transistor) 16*a* and an auxiliary capacitor (CS) 22*a*. Connected to the sub-pixel 10*b* are a TFT 22*b* and an auxiliary capacitor 22*b*. FIG. 12 shows an example of a pixel structure in which the single display pixel is divided into the two sub-pixels. Specifically, FIG. 12 shows a structure in which the sub-pixels have substantially the same area and are divided and arranged in a vertical direction. However, an effect of multi-pixel driving is not limited to the dividing method of FIG. 12. The sub-pixels may have substantially the same area as shown in FIG. 12 or may have different areas. Specifically, an area of a sub-pixel whose luminance level is high in a halftone display state may be made smaller or larger than that of a sub-pixel whose luminance level is low in a halftone display state. In view of reducing viewing angle characteristics, it is preferable that the area of the sub-pixel whose luminance level is high in a halftone display state be smaller than that of the sub-pixel whose luminance level is low in a halftone display state. Further, the sub-pixels having different luminance levels in a halftone display state do not need to be divided and arranged in a vertical direction. Instead, the sub-pixels may be arranged along a reference axis based on a pixel line in a horizontal direction. This arrangement is preferable in terms of display quality because a distribution of display polarities of the sub-pixels takes the form of dot reversal. FIGS. 17(*a*) and 17(*b*) show examples of arrangements of sub-pixels disposed over a plurality of pixels. Open circles "o" of FIGS. 17(*a*) and 17(*b*) represent sub-pixels whose display luminance levels are high. A plus sign "+" or a minus sign "−" enclosed in each of the open circles represents an electric polarity of each of the pixels. (When a potential of the pixel (sub-pixel) is higher than that of a counter electrode, the plus sign is used. When the potential of the pixel (sub-pixel) is lower than that of the counter electrode, the minus sign is used.)

FIG. 17(*a*) shows a sub-pixel arrangement based on the arrangement of FIG. 12, and FIG. 17(*b*) a sub-pixel arrangement based on the foregoing preferred arrangement. In FIG. 17(*a*), the sub-pixels whose luminance levels are high in a halftone display state are arranged checkerwise. (Although a luminance center of the pixel does not correspond to that of the sub-pixels, the sub-pixels are highly dispersed within a screen.), and the bright sub-pixels having positive (+) or negative (−) display polarities are arranged in horizontal linear groups. That is, the arrangement of the sub-pixels having high luminance levels takes the form of line reversal. In FIG. 17(*b*), on the contrary, the sub-pixel having high luminance levels are arranged in the center of the pixel (The luminance center of the pixel corresponds to that of the sub-pixels), and the display polarities of the sub-pixels having high luminance levels takes the same form of dot reversal as the display polarity of the pixel. Thus, the sub-pixel arrangement of FIG. 17(*b*) is more preferable than that of FIG. 17(*a*).

Furthermore, a shape of each of the sub-pixels is not limited to a rectangle. Especially, in case of the MVA mode, the shape may be a triangle, a rhombus, or other shapes. This arrangement is preferable in terms of a panel aperture ratio (see FIG. 17(*c*)).

A gate electrode of the TFT 16*a* and a gate electrode of the TFT 16*b* are connected to a common (the same) scanning line 12, and a source electrode of the TFT 16*a* and a source electrode of the TFT 16*b* are connected to a common (the same) signal line 14. The auxiliary capacitors 22*a* and 22*b* are connected to an auxiliary capacitance wire (CS bus line) 24*a* and an auxiliary capacitance wire 24*b*, respectively.

The auxiliary capacitor 22*a* includes an auxiliary capacitance electrode electrically connected to the sub-pixel electrode 18*a*, an auxiliary capacitance counter electrode electrically connected to the auxiliary capacitance wire 24*a*, and an insulative layer (not shown) provided between the auxiliary capacitance electrode and the auxiliary capacitance counter electrode. The auxiliary capacitor 22*b* includes an auxiliary capacitance electrode electrically connected to the sub-pixel electrode 18*b*, an auxiliary capacitance counter electrode electrically connected to the auxiliary capacitance wire 24*b*, and an insulative layer (not shown) provided between the auxiliary capacitance electrode and the auxiliary capacitance counter electrode. The auxiliary capacitance counter electrode of the auxiliary capacitor 22*a* and the auxiliary capacitance counter electrode of the auxiliary capacitor 22*b* are independent of each other and are arranged so as to receive different auxiliary capacitance counter voltages from the auxiliary capacitance wires 24*a* and 24*b*, respectively.

Furthermore, FIGS. 13(*a*) to 13(*f*) show driving signals of the liquid crystal display device of FIG. 12. FIG. 13(*a*) shows a voltage waveform Vs of the signal line 14. FIG. 13(*b*) shows a voltage waveform Vc of the auxiliary capacitance wire 24*a*. FIG. 13(*c*) shows a voltage waveform Vcsb of the auxiliary capacitance wire 24*b*. FIG. 13(*d*) shows a voltage waveform Vg of the scanning line 12. FIG. 13 shows (e) a voltage waveform Vlca of the sub-pixel electrode 18*a*. FIG. 13(*f*) shows a voltage waveform Vlcb of the sub-pixel electrode 18*b*. Further, a dotted line of each of FIGS. 13(*a*) to 13(*f*) indicates a voltage waveform COMMON (Vcom) of a counter electrode (not shown in FIG. 12).

First, at time T1, a voltage of Vg changes from VgL to VgH, so that the TFT 16*a* and the TFT 16*b* are simultaneously put in a conductive state (ON state). In this way, a voltage Vs of the signal line 14 is transferred to the sub-pixel electrodes 18*a* and 18*b*, so that the sub-pixels 10*a* and 10*b* are charged. Similarly, the auxiliary capacitor 22*a* of the sub-pixel 10*a* and the auxiliary capacitor 22*b* of the sub-pixel 10*b* are charged by means of the signal line 14.

Next, at time T2, the voltage Vg of the scanning line 12 changes from VgH to VgL, so that the TFT 16*a* and the TFT 16*b* are simultaneously put in a nonconductive state (OFF state). In this way, the sub-pixels 10*a* and 10*b* and the auxiliary capacitors 22*a* and 22*b* stop being charged, so that all of the sub-pixels 10*a* and 10*b* and the auxiliary capacitors 22*a* and 22*b* are electrically insulated from the signal line 14. Right after this, due to a pull-in effect caused by parasitic capacitances and the like of the TFT 16*a* and the TFT 16*b*, a voltage Vlca of the sub-pixel electrode 18*a* and a voltage Vlcb of the sub-pixel electrode 18*b* decrease by substantially the same voltage Vd, so that $$Vlca=Vs-Vd \text{ and}$$

$$Vlcb=Vs-Vd.$$

Further, at this time, a voltage Vcsa of the auxiliary capacitance wire 24*a* and a voltage of Vcsb of the auxiliary capacitance wire 24*b* are such that $$Vcsa=Vcom-Vad \text{ and}$$

$$Vcsb=Vcom+Vad.$$

At time T3, the voltage Vcsa of the auxiliary capacitance wire 24*a* connected to the auxiliary capacitor 22*a* changes from Vcom−Vad to Vcom+Vad, and the voltage Vcsb of the auxiliary capacitance wire 24*b* connected to the auxiliary capacitor 22*b* changes from Vcom+Vad to Vcom−Vad. In accordance with these voltage changes, the voltage Vlca of the sub-pixel electrode 18*a* and the voltage Vlcb of the sub-pixel electrode 18*b* change so that $$Vlca=Vs-Vd+2\times K\times Vad$$ and $$Vlcb=Vs-Vd-2\times K\times Vad.$$

However, K=CCS/(CLC(V)+CCS), where CLC(V) represents an electrostatic capacitance value of a liquid crystal capacitor of each of the sub-pixels 10*a* and 10*b*, and a value of CLC(V) depends on an effective voltage (V) applied to a liquid crystal layer of each of the sub-pixels 10*a* and 10*b*. Further, CCS represents an electrostatic capacitance value of each of the auxiliary capacitors 22*a* and 22*b*.

At time T4, Vcsa changes from Vcom+Vad to Vcom−Vad, and Vcsb changes from Vcom−Vad to Vcom+Vad. Further, Vlca changes from Vlca=Vs−Vd+2×K×Vad to Vlca=Vs−Vd, and Vlcb changes from Vlcb=Vs−Vd−2×K×Vad to Vlcb=Vs−Vd.

At time T5, Vcsa changes from Vcom−Vad to Vcom+Vad, and Vcsb changes from Vcom+Vad to Vcom−Vad, only by twice as much as Vad. Further, Vlca changes from Vlca=Vs−Vd to Vlca=Vs−Vd+2×K×Vad, and Vlcb changes from Vlcb=Vs−Vd to Vlcb=Vs−Vd−2×K×Vad.

Vcsa, Vcsb, Vlca, and Vlcb alternately repeat the changes at T3 and T5. Intervals or phases at which T3 and T5 are repeated may be adjusted appropriately in view of methods (polarity reversal method and other methods) for driving liquid crystal display devices and display states (flickering, rough display, and other states). (For example, the intervals at which T3 and T5 are repeated can be set to 0.5 H, 1 H, 2 H, 4 H, 6 H, 8 H, 10 H, 12 H, or the like (1 H is a single period of horizontal writing time).) This repetition continues until the pixel 10 is rewritten next time, i.e., until time equivalent to T1. Therefore, an effective value of the voltage Vlca of the sub-pixel electrode 18*a* and an effective value of the voltage Vlcb of the sub-pixel electrode 18*b* are such that $$Vlca=Vs-Vd+K\times Vad$$ and $$Vlcb=Vs-Vd-K\times Vad.$$

Consequently, an effective voltage V1 applied to the liquid crystal layer of the sub-pixel 10*a* and an effective voltage V2 applied to the liquid crystal layer of the sub-pixel 10*b* are such that $$V1=Vlca-Vcom$$ and $$V2=Vlcb-Vcom,$$

that is, $$V1=Vs-Vd+K\times Vad-Vcom$$ and $$V2=Vs-Vd-K\times Vad-Vcom.$$

Therefore, a difference ΔV12 (=V1-V2) between the effective voltage applied to the liquid crystal layer of the sub-pixel 10*a* and the effective voltage applied to the liquid crystal layer of the sub-pixel 10*b* becomes ΔV12=2×K×Vad, so that different voltages can be applied to the sub-pixels 10*a* and 10*b* respectively.

FIG. 14 shows an equivalent circuit of the arrangement of FIG. 12. Because a capacitance of a counter electrode COMMON is very high, impedance R from a connection point P against an inside of the counter electrode COMMON is very high, the connection point P being a point at which counter electrodes of sub-pixel electrodes 18*a* and 18*b* of liquid crystal capacitors CLC are connected. Therefore, when the TFT 16*a* and the TFT 16*b* are in an OFF state, a series circuit is formed which runs from the auxiliary capacitance wire 24*a* through the auxiliary capacitor 22*a*, the liquid crystal capacitor CLC of the sub-pixel 10*a*, the liquid crystal capacitor CLC of the sub-pixel 10*b*, and the auxiliary capacitor 22*b* in this order to the auxiliary capacitance wire 24*b*. This causes a current ia to be equal to a current ib, the current ia flowing from the auxiliary capacitance wire 24*a* into the auxiliary capacitor 22*a*, the current ib flowing from the auxiliary capacitor 22*b* into the auxiliary capacitance wire 24*b*. The currents ia and ib are equal also when flowing in the opposite directions.

Accordingly, as shown in FIG. 15, a single capacitor PANEL is formed assuming that the liquid crystal capacitor CLC of the sub-pixel 10*a* and the liquid crystal capacitor CLC of the sub-pixel 10*b* are serially connected. Moreover, a series circuit 100 is formed assuming that the auxiliary capacitor 22*a* and the auxiliary capacitor 22*b* are serially connected on both sides of the capacitor PANEL, and the series circuit 100 is charged and discharged. However, at a point which corresponds to the connection point P and lies between electrodes of the capacitor PANEL, a potential of the series circuit 100 is fixed at the potential Vcom of the counter electrode COMMON.

The series circuit 100 is charged and discharged by controlling potentials of the auxiliary capacitance wires 24*a* and 24*b* as shown in FIGS. 13(*a*) and 13(*b*). In FIG. 15, in order to generate the potentials of the auxiliary capacitance wires 24*a* and 24*b*, four bipolar transistors Tr1 to Tr4 are used as switches to cause a charge-discharge current of the series circuit 100 to flow from a high voltage source VIN and a low voltage source GND while alternately reversing the direction. The transistor Tr1 is an NPN-type transistor whose collector is connected to the voltage source VIN. The transistor Tr2 is a PNP-type transistor whose collector is connected to the voltage source GND. An emitter of the transistor Tr1 and an emitter of the transistor Tr2 are connected to each other. The transistor Tr3 is an NPN-type transistor whose collector is connected to the voltage source VIN. The transistor Tr4 is a PNP-type transistor whose collector is connected to the voltage source GND. An emitter of the transistor Tr3 and an emitter of the transistor Tr4 are connected to each other. The series circuit 100 is provided between the emitters of the transistors Tr1 and Tr2 and the emitters of the transistors Tr3 and Tr4.

While Vcsa>Vcsb in FIGS. 13(*b*) and 13(*c*), the transistors Tr1 and Tr4 are put in an ON state, and the transistors Tr2 and Tr3 are put in an OFF state, so that a current flows in a direction A of FIG. 15. While Vcsa<Vcsb in FIGS. 13(*b*) and 13(*c*), the transistors Tr1 and Tr4 are put in an OFF state, and the transistors Tr2 and Tr3 are put in an ON state, so that a current flows in a direction B of FIG. 15. In order to perform push-pull operation of the transistors Tr1 and Tr2 and push-pull operation of the transistors Tr3 and Tr4, a pulse signal CS 1 is inputted through a buffer 101 into a base of the transistor Tr1 and a base of the transistor Tr2. A pulse signal CS2 is inputted through a buffer 102 into a base of the transistor Tr3 and a base of the transistor Tr4. The pulse signals CS1 and CS2 are signals whose phases are opposite to each other.

In the circuit of FIG. 15, for example, when a current flows in the direction A, the potential of the auxiliary capacitance wire 24*a* gradually increases and the potential of the auxiliary capacitance wire 24*b* gradually decreases while the transistors Tr1 and Tr4 are put in an ON state. Therefore, in order to keep the transistors Tr1 and Tr4 in an ON state until the potential Vcsa of the auxiliary capacitance wires 24*a* and the potential Vcsb of the auxiliary capacitance wires 24*b* become target potentials, a potential higher than a predetermined value with respect to an emitter potential needs to be supplied to the base of the transistor Tr1 and a potential lower than the predetermined value with respect to the emitter potential needs to be supplied to the base of the transistor Tr4. That is, a pulse potential of the pulse signal CS1 is set to a potential at least 0.7 V higher than a target value of Vcsa, and a pulse potential of the pulse signal CS2 is set to a potential at most 0.7 V lower than a target value of Vcsb. For example, when the pulse potential of the pulse signal CS1 is 0.7 V higher than the target value of the Vcsa and the pulse potential of the pulse signal CS2 is 0.7 V lower than the target potential of Vcsb, the auxiliary capacitance wire 24*a* reaches the target value of Vcsa in a pulse period of the pulse signal CS1 and the auxiliary capacitance wire 24*b* reaches the target value of Vcsb in a pulse period of the pulse signal CS2. At this point, the transistor Tr1 and Tr4 are put in an OFF state, so that charging and discharging are completed.

However, in an initial point of the pulse period of the pulse signals CS1 or CS2, a high potential is applied between the base and emitter of the transistor Tr1 or Tr4, so that a collector current of-the transistor Tr1 or Tr4 is very high in the initial point of the pulse period. Further, when a current flows in the direction A, there stands the following magnitude relation in potential: 0<target value of Vcsb<target value of Vcsa<VIN (A "voltage source" sign is substituted for a "potential" sign). Then, a voltage of VIN-Vcsa is applied between the collector and emitter of the transistor Tr1, and a voltage of Vcsb-0 is applied between the collector and emitter of the transistor Tr4. Therefore, a voltage between the collector and emitter of the transistor Tr1 or Tr4 is very high in an initial point of a period during which a current flows. Therefore, in the initial point of the pulse period, power consumption represented by a product of the collector voltage and the collector-emitter voltage is very high. Moreover, this happens per unit time twice as many times as frequencies of Vcsa and Vcsb. This generates a large amount of heat in the transistors Tr1 and Tr4 and raises their temperatures. The same applies to the transistors Tr2 and Tr3.

Accordingly, in order to solve this problem, an arrangement of FIG. 16 may be adopted. In FIG. 16, transistors FET1 to FET4 are used instead of the transistors Tr1 to Tr4 of FIG. 15. The transistors FET1 and FET3 are P-channel MOSFETs, and the transistors FET2 and FET4 are N-channel MOSFETs. Further, in FIG. 16, a high voltage source VH and a low voltage source VL are used instead of the voltage sources VH and VL of FIG. 15. A potential of the voltage source VH and a potential of the voltage source VL have the following magnitude relation: 0<VL<VH<VIN (A "voltage source" sign is substituted for a "potential" sign). A source of the transistor FET1 is connected to the voltage source VH, and a source of the transistor FET2 is connected to the voltage source VL. A drain of the transistor FET1 and a drain of the transistor FET2 are connected to each other. A source of the transistor FET3 is connected to the voltage source VH, and a source of the transistor FET4 is connected to the voltage source VL. A drain of the transistor FET3 and a drain of the transistor FET4 are connected to each other. Further, a pulse signal GS1 is inputted into a gate of the transistor FET1 and a gate of the transistor FET2, and a pulse signal GS2 is inputted into a gate of the transistor FET3 and a gate of the transistor FET4. The pulse signals GS1 and GS2 are signals whose phases are opposite to each other.

In case of the arrangement of FIG. 16, when a current flows in a direction A, target value of Vcsa=VH, and target value of Vcsb=VL. When a current flows in a direction B, target value of Vcsa=VL, and target value of Vcsb=VH. The pulse signals GS1 and GS2 are ON/OFF signals for causing the currents to flow. In this case, in a pulse period during which the current flows in the direction A or B, a gate-source voltage of each of the transistors is fixed at VH-pulse potential of GS1, pulse potential of GS1-VL, VH-pulse potential of GS2, or pulse potential of GS2-VL. In an initial point of the pulse period, a relatively high voltage is applied between the drain and source of each of the transistors FET1 to FET4, the applied voltage being a difference between each of the potentials VH and VL and an initial potential of each of the auxiliary capacitance wires 24*a* and 24*b*. Therefore, regardless of whether the applied voltage is high or low, a drain current has a substantially constant value corresponding to the gate-source voltage. Thereafter, in the direction A, the potential of the auxiliary capacitance wire 24*a* increases and the potential of the auxiliary capacitance wire 24*b* decreases. Further, in the direction B, the potential of the auxiliary capacitance wire 24*a* decreases and the potential of the auxiliary capacitance wire 24*b* increases. This causes the drain-source voltage of each of the transistors to become low and enter a normal region of switching operation, so that the drain current decreases. There stands a relation of potential 0<VL<VH<VIN, so that, in the initial point of the pulse period, the drain-source voltages of the transistors FET1 to FET4 become lower than the collector-emitter voltages of the transistors Tr1 to Tr4 of FIG. 15. Therefore, when drain currents of the transistors FET1 to FET4 are made lower to some extent, it is possible to cause the transistors FET1 to FET4 to consume less power. This makes it possible to generate less heat.

However, according to the arrangement of FIG. 16, although the voltage source VL is a positive voltage source, the voltage source VL serves as a sink-current-flowing voltage source into which a current keeps on flowing. Therefore, as charge-discharge operation is continued by using the transistors FET1 to FET4, a quantity of positive charges stored in the voltage source VL is not negligible with respect to a capacitance of the voltage source VL. This causes a potential of the voltage source VL to gradually increase and raises such a problem that the voltage source VL no longer functions as a constant voltage source. In such a situation, the potential of the auxiliary capacitance wire 24*a* and the potential of the auxiliary capacitance wire 24*b* cannot be controlled accurately, so that the potential Vlca of the sub-pixel electrode 18*a* and the potential Vlcb of the sub-pixel electrode 18*b* cannot be controlled accurately.

SUMMARY OF THE INVENTION

The present invention has been made in view of the foregoing problems and has as an object to provide a capacitive load charge-discharge device and a liquid crystal display device including the same capacitive load charge-discharge device. The capacitive load charge-discharge device employs homopolar voltage sources as a high voltage source and a low voltage source. When the capacitive load charge-discharge device charges and discharges a capacitive load by alternately reversing the direction of a current, the capacitive load charge-discharge device can stabilize a constant voltage function of each of the voltage sources while generating less heat.

In order to achieve the foregoing object, a capacitive load charge-discharge device of the present invention is a capacitive load charge-discharge device, including: plural types of constant voltage sources having different output potentials; and a capacitive load whose charging-discharging is performed by the plural types of constant voltage sources, the capacitive load charge-discharge device performing the charging-discharging by connecting one of the constant voltage sources as a high voltage source to a first voltage application terminal of the capacitive load and connecting one of the constant voltage sources as a low voltage source to a second voltage application terminal of the capacitive load, wherein: the constant voltage sources serve as at least either positive voltage sources serving as sink-current-flowing voltage sources or negative voltage sources serving as source-current-flowing voltage sources, and when the constant voltage sources serve as the sink-current-flowing voltage sources, each of the sink-current-flowing voltage sources includes stored energy adjusting means which at least discharges energy stored therein so that the energy leans toward a negative side, and when the constant voltage sources serve as the source-current-flowing voltage sources, each of the source-current-flowing voltage sources includes the stored energy adjusting means which at least replenishes the energy stored therein so that the energy leans toward a positive side.

According to the foregoing invention, in case of the constant voltage sources serving as both the positive voltage sources and the sink-current-flowing voltage sources, the adjustment of the stored energy stabilizes an output potential of each of the sink-current-flowing voltage sources when energy supplied to the sink-current-flowing voltage source is balanced by energy discharged from the sink-current-flowing voltage source. Alternatively, in case of the constant voltage sources serving as both the positive voltage sources and the source-current-flowing voltage sources, the adjustment of the stored energy stabilizes an output potential of each of the source-current-flowing voltage sources when energy discharged from the source-current-flowing voltage source is balanced by energy supplied to the source-current-flowing voltage source.

Therefore, using a MOSFET as an element for switching between the voltage application terminals brings about an effect of stabilizing a constant voltage function of each of the constant voltage sources serving as both the positive voltage sources and the sink-current-flowing voltage sources and a constant voltage function of each of the constant voltage sources serving as both the positive voltage sources and the source-current-flowing voltage sources, while generating less heat, when the capacitive load is charged and discharged by alternately reversing the direction of a current.

In order to solve the foregoing problems, a liquid crystal display device of the present invention includes the liquid crystal display element which has the capacitive load charge-discharge device.

According to the foregoing invention, it is possible to achieve a multi-pixel driving liquid crystal display device which has high display quality.

For a fuller understanding of the nature and advantages of the invention, reference should be made to the ensuing detailed description taken in conjunction with the accompanying drawings.

DESCRIPTION OF THE EMBODIMENTS

First Embodiment

One embodiment of the present invention will be described below.

Figure 1:
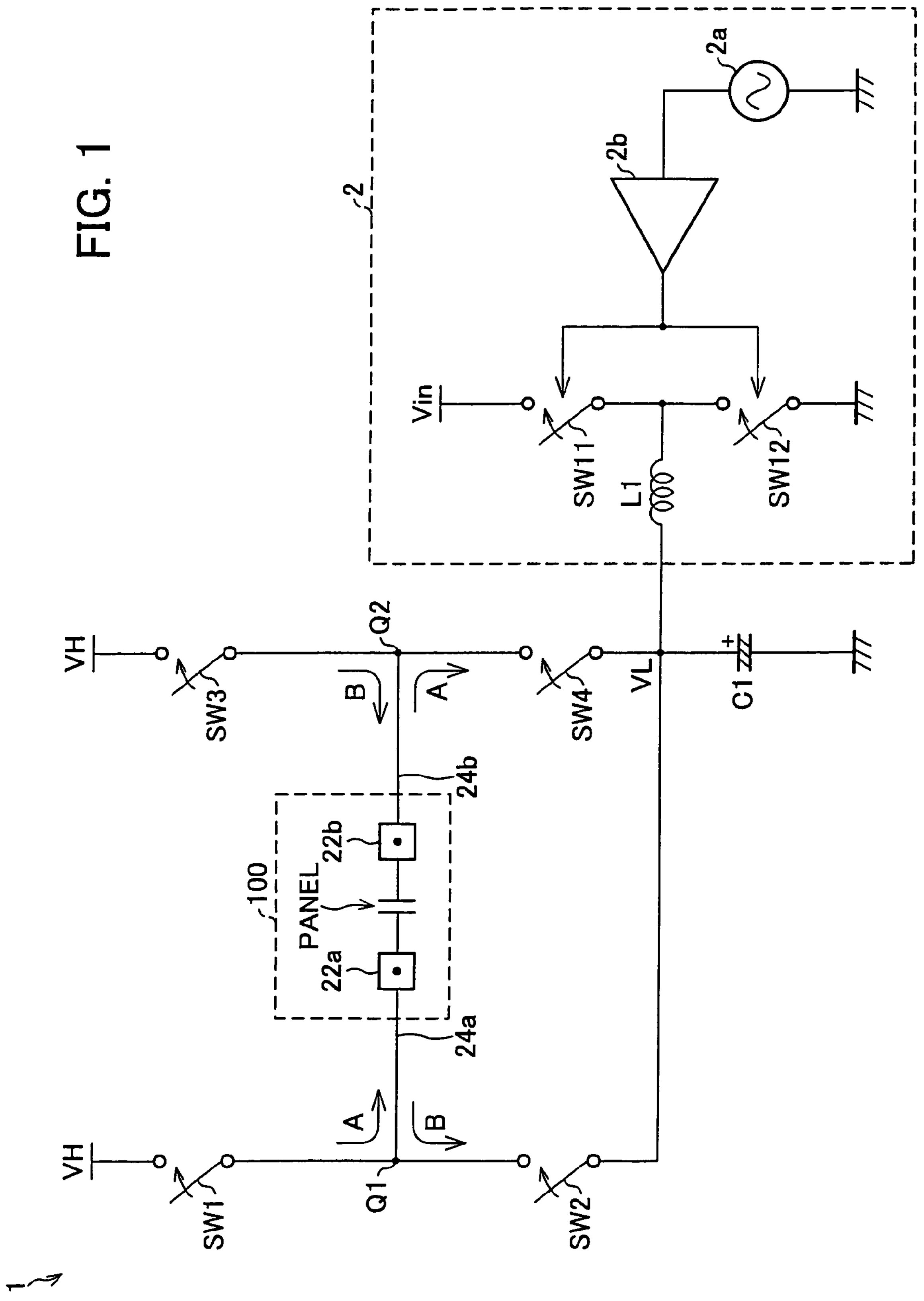
FIG. 1 is a circuit block diagram showing an arrangement of a pixel charge-discharge circuit according to one embodiment of the present invention.
Figure 15:
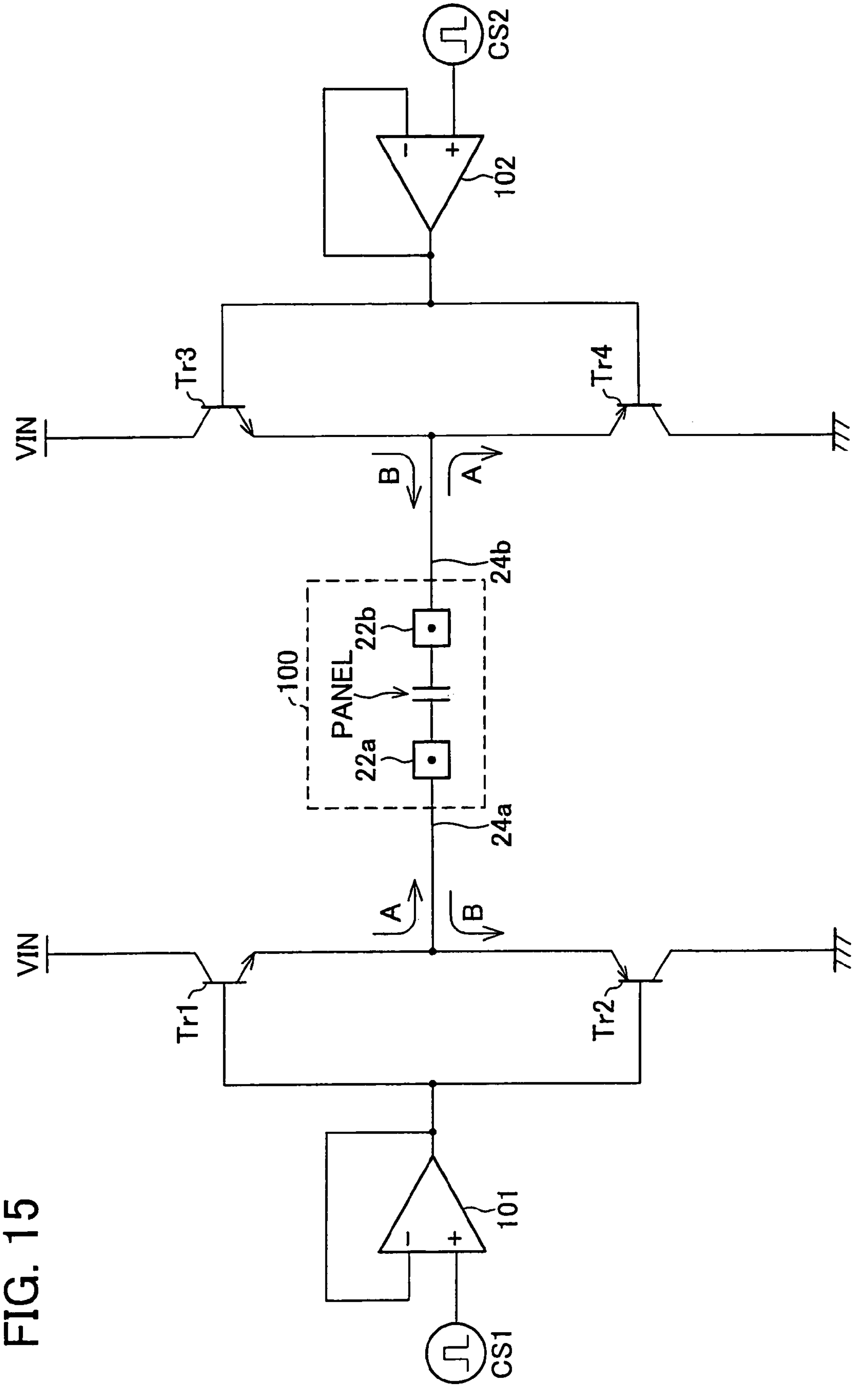
FIG. 15 is a circuit block diagram showing an arrangement which charges and discharges the pixel structure of FIG. 12.
Figure 16:
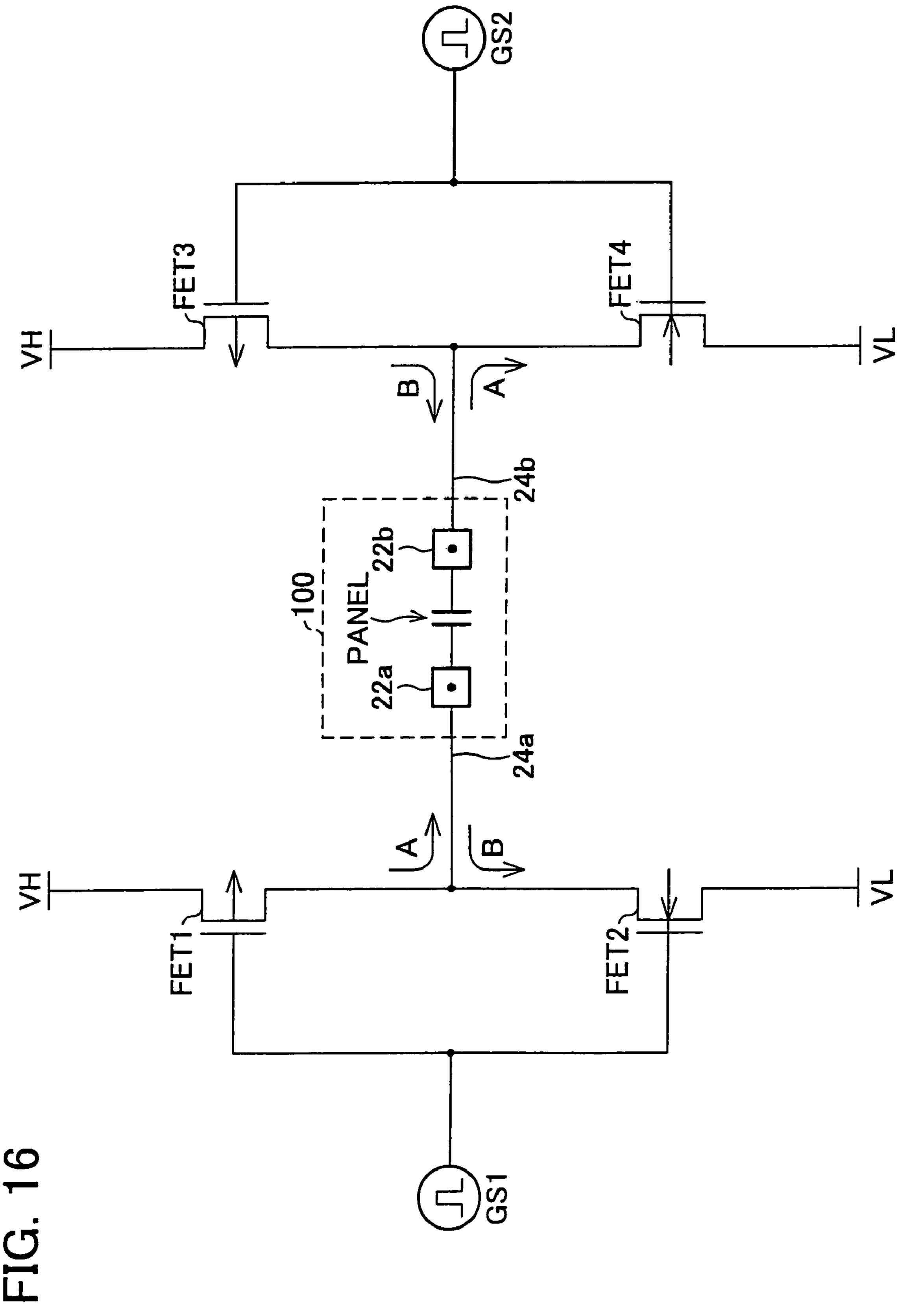
FIG. 16 is a circuit block diagram showing another arrangement which charges and discharges the pixel structure of FIG. 12.
Figures 17A, 17B, 17C:
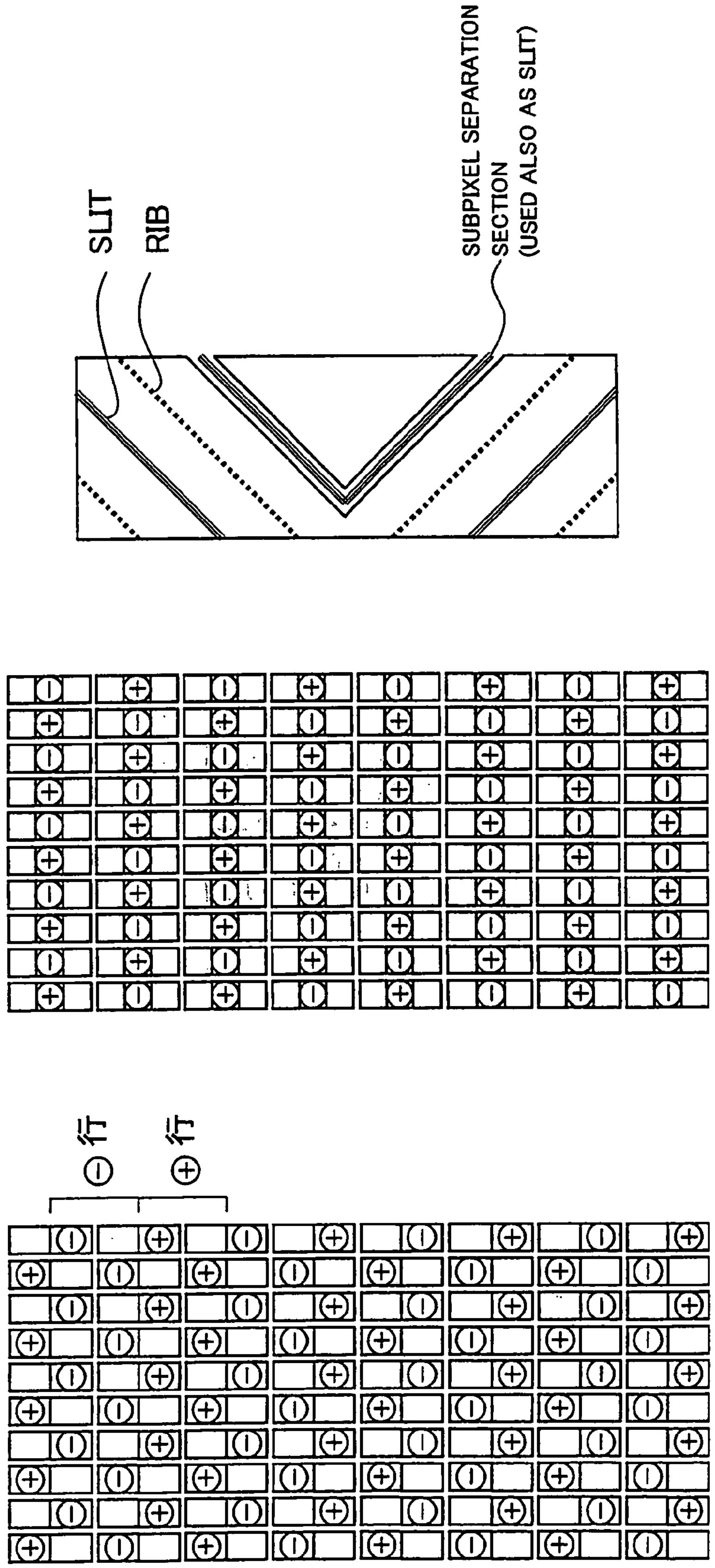
FIGS. 17(*a*) and 17(*b*) are plan views showing examples of arrangements of sub-pixels disposed over a plurality of pixels, and FIG. 17(*c*) is a plan view showing an example of a shape of each of the sub-pixels.

FIG. 1 shows a single pixel of an arrangement of a pixel charge-discharge circuit (capacitive load charge-discharge device) 1 of a liquid crystal display device according to the present embodiment. Components given the same reference numerals as those in FIGS. 15 and 16 have the same functions unless otherwise noted.

The pixel charge-discharge circuit 1 includes a series circuit 100, auxiliary capacitance wires 24*a* and 24*b*, two types of voltage sources VH and VL, switches SW1 to SW4, and a stored energy adjustment section 2. The series circuit 100 is a capacitive load. The auxiliary capacitance wire 24*a* is a first auxiliary capacitance wire. The auxiliary capacitance wire 24*b* is a second auxiliary capacitance wire.

In the pixel charge-discharge circuit 1, the switch SW1 and the switch SW2 are connected serially between one of the voltage sources VH and one of the voltage sources VL with the switch SW1 positioned on a side of the voltage source VH. The switch SW1 and the switch SW2 are connected at the connection point Q1, and the series circuit 100 includes an auxiliary capacitor 22*a* which has a terminal. Moreover, the connection point Q1 and the terminal of the auxiliary capacitor 22*a* are connected by the auxiliary capacitance wire 24*a*. Further, the switch SW3 and the switch SW4 are connected serially between the other of the voltage sources VH and the other of the voltage sources VL with the switch 3 positioned on a side of the voltage source VH. The switch SW3 and the switch SW4 are connected at the connection point Q2, and the series circuit 100 includes an auxiliary capacitor 22*b* which has a terminal. Moreover, the connection point Q2 and the terminal of the auxiliary capacitor 22*b* are connected by the auxiliary capacitance wire 24*b*. The connection points Q1 and Q2 serve as two voltage application terminals of the series circuit 100. In FIG. 1, the voltage sources VH are identical with each other, and the voltage sources VL are identical with each other.

The switch SW1 and the switch SW2 perform push-pull operation, and the switch SW3 and the switch SW4 perform push-pull operation. Whereas the switch SW1 and the switch SW4 are simultaneously put in an ON state and an OFF state, the switch SW2 and the switch SW3 are simultaneously put in an ON state and an OFF state. Each of the voltage sources VH is a high-potential constant voltage source, and each of the voltage sources VL is a low-potential constant voltage source. Both of the voltage sources VH and VL are positive voltage sources. That is, when VH is substituted for a potential of the voltage source VH and VL is substituted for a potential of the voltage source VL, $VH>VL>0$. When the switches SW1 and SW4 are put in an ON state and the switches SW2 and SW3 are put in an OFF state, the connection point Q1 is connected to the voltage source VH and the connection point Q2 is connected to the voltage source VL, so that a current flows from the voltage source VH through the connection point Q1, the auxiliary capacitance wire 24*a*, the series circuit 100, the auxiliary capacitance wire 24*b*, and the connection point Q2 into the voltage source VL, as indicated by a direction A in FIG. 1. When the switches SW2 and SW3 are put in an ON state and the switches SW1 and SW4 are pit in an OFF state, the connection point Q1 is connected to the voltage source VL and the connection point Q2 is connected to the voltage source VH, so that a current flows from the voltage source VH through the connection point Q2, the auxiliary capacitance wire 24*b*, the series circuit 100, the auxiliary capacitance wire 24*a*, and the connection point Q1 into the voltage source VL, as indicated by a direction B in FIG. 1.

Thus, in the pixel charge-discharge circuit 1, the two voltage application terminals of the series circuit 100 are alternately switched between the connection point Q1 and the connection point Q2, one of the two voltage application terminals being connected to the voltage source VH, the other of the two voltage application terminals being connected to the voltage source VL.

As shown in FIG. 1, there is a capacitor C1 between the voltage source VL and GND. Moreover, connected to the capacitor C1 is the stored energy adjustment section 2. The stored energy adjustment section (stored energy adjusting means) 2 includes a voltage source Vin·GND, switches SW11 and SW12, a pulse voltage source 2*a*, a buffer 2*b*, and a coil L1. In the stored energy adjustment section 2, the switch SW1 and the switch SW12 are serially connected with the switch SW11 positioned on a side of the voltage source Vin. When Vin is substituted for a potential of the voltage source Vin, $Vin \geqq VL$. The pulse voltage source 2*a* inputs a pulse signal serving as an ON/OFF signal commonly into a control terminal of the switch SW11 and a control terminal of the switch SW12 through the buffer 2*b*, and when one of the switches SW11 and SW12 is put in an ON state, the other is put in an OFF state. An ON duty of the switch SW11 and an ON duty of the switch SW12 are determined by a duty of the pulse signal. Further, a positive terminal of the capacitor C1 and a connection point at which the switch SW11 and the switch SW12 are connected are connected by the coil L1. The coil L1 smoothes two types of current. One type of current flows from the voltage source Vin into the positive terminal of the capacitor C1 when the switch SW11 is put in an ON state. The other type of current flows from the positive terminal of the capacitor C1 into the voltage source GND when the switch SW12 is put in an ON state. In this way, the capacitor C1 receives energy from the voltage source Vin. Further, the capacitor C1 discharges the energy to the voltage source GND. The current-smoothing effect of the coil L1 eases off the giving and receiving of the energy.

Figure 13:
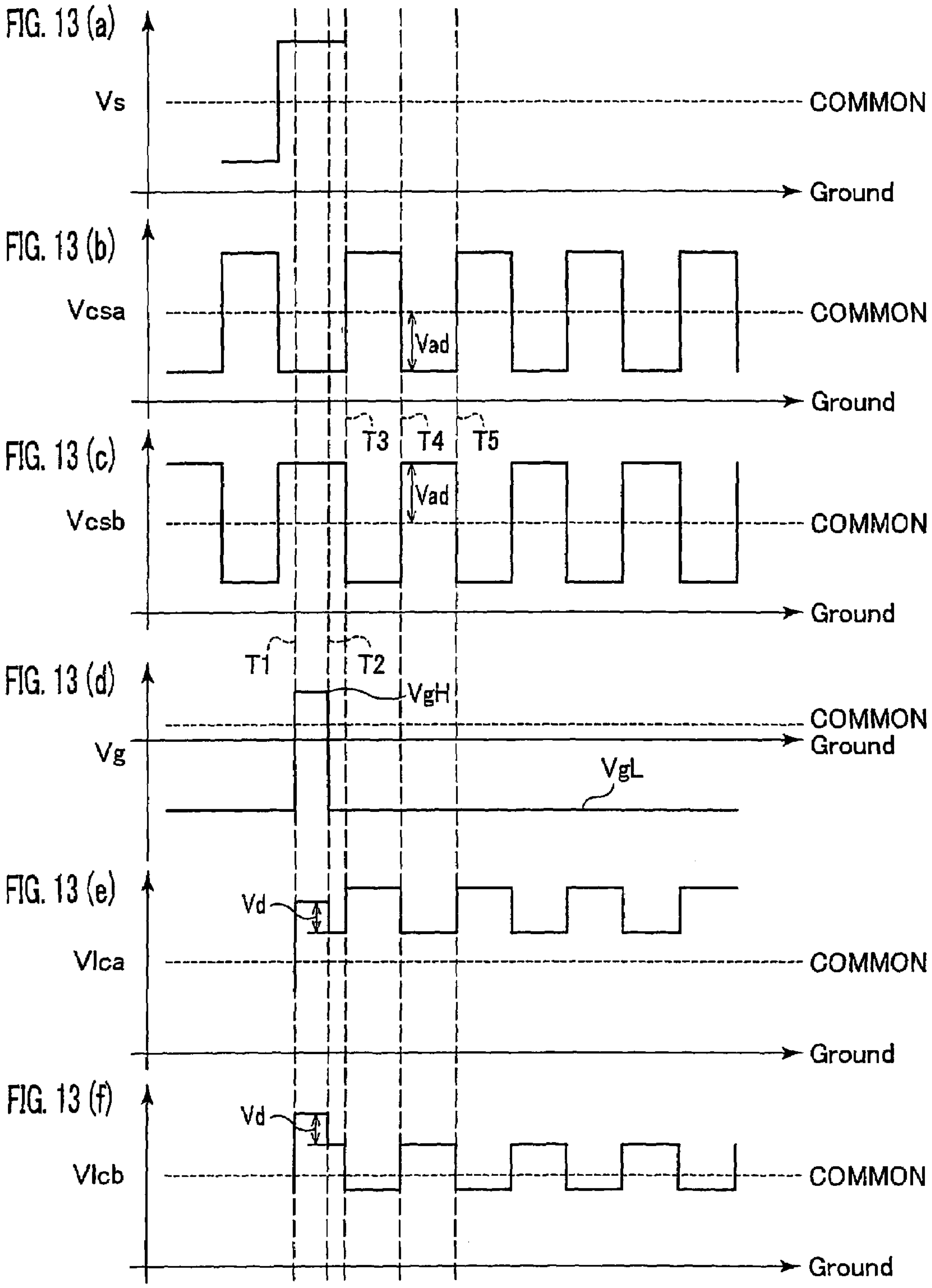
FIGS. 13(*a*) to 13(*f*) are waveform charts showing conventional driving signals in the liquid crystal display device which performs multi-pixel driving.
Figure 14:
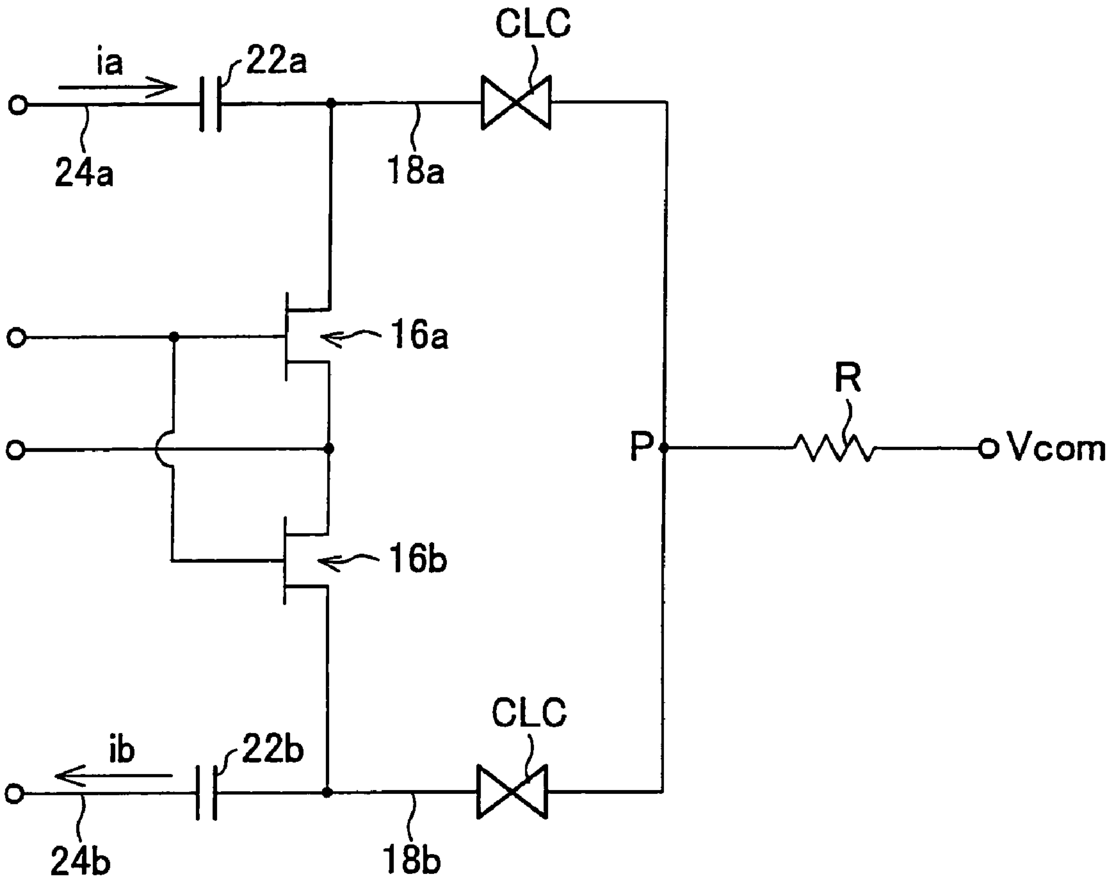
FIG. 14 is a circuit block diagram showing an equivalent circuit of the pixel structure of FIG. 12.

In the pixel charge-discharge circuit 1 of the foregoing arrangement, when a potential of the auxiliary capacitance wire 24*a* and a potential of the auxiliary capacitance wire 24*b* are changed like the potentials Vcsa and Vcsb of FIGS. 13(*b*) and 13(*c*), a voltage VH of the voltage source VH is made equal to a high level of the potential Vcsa and a high level of the potential Vcsb, and a potential VL of the voltage source VL is made equal to a low level of the potential Vcsa and a low level of the potential Vcsb. Moreover, the switches SW1 to SW4 are formed by using MOSFETs (metal-oxide semiconductor field-effect transistors). Thus, when a charge-discharge current of the series circuit 100 flows, the charge-discharge current becomes a current whose positive charges continue to be stored in the positive terminal of the capacitor C1 of the voltage source VL regardless of whether the current flows in the direction A or B, so that the voltage source VL serves as a suction power voltage. Therefore, when the stored charges of the capacitor C1 are kept intact, an output potential of the voltage source VL keeps on increasing. However, in the present embodiment, the output potential of the capacitor C1 is adjusted by adjusting electrostatic energy, i.e., the stored energy of the capacitor C1, by using the stored energy adjustment section 2. The ON duties and the ON/OFF cycles of the switches SW11 and SW12 are appropriately adjusted by the pulse signal, so that energy discharged from the positive terminal of the capacitor C1 through the coil L1 and the switch SW12 can be made higher than the energy supplied from the voltage source VL through the switch SW11 and the coil L1 to the capacitor C1. Moreover, discharged energy represented by the difference between the energies can be balanced by energy supplied from the series circuit 100 to the capacitor C1.

Thus, according to the present embodiment, the pixel charge-discharge circuit 1 includes the stored energy adjustment section 2, and the stored energy adjustment section 2 discharges the electrostatic energy, which is supplied from the series circuit 100 so as to increase, in an appropriate period during which the switches SW11 and SW12 are put in an ON state, so that the electrostatic energy of the voltage source VL leans toward a negative side. When this adjustment of the electrostatic energy causes energy supplied from the voltage source VL to be balanced by energy discharged from the voltage source VL, it is possible to stabilize an output potential of the voltage source VL serving as both a positive voltage source and a sink-current-flowing voltage source. Therefore, using MOSFETs like those of FIG. 16 as the switches SW1 to SW4 for switching between the voltage application terminals makes it possible to stabilize a constant voltage function of the voltage source VL, while generating less heat, when the series circuit 100 is charged and discharged by alternately reversing the direction of a current.

This brings about an effect of accurately controlling a potential of each sub-pixel in a binary multi-pixel driving liquid crystal display element which reduces viewing angle dependency of gamma characteristics.

According to the present embodiment, the constant voltage sources are two types of constant voltage sources having two different output potentials. Note, however, that there only need to be provided plural types of constant voltage sources having different output potentials. Further, the stored energy adjustment section 2 causes the stored energy of the capacitor C1 to lean toward a negative side but may also cause the stored energy of the capacitor C1 to lean toward a positive side. The stored energy adjustment section 2 only needs to be able to cause the stored energy of the capacitor C1 to lean at least toward a negative side.

Further, a constant voltage source including the stored energy adjusting means may be a voltage source serving as both a negative voltage source and a source-current-flowing voltage source. For example, when there are provided two types of negative voltage sources serving as constant voltage sources, a high voltage source serves as the source-current-flowing voltage source. In case of the negative source-current-flowing voltage source, the stored energy adjusting means only needs to be able to at least replenish energy stored in the source-current-flowing voltage source so as to cause the stored energy to lean toward a positive side. When the adjustment of the stored energy causes energy discharged from the source-current-flowing voltage source to be balanced by energy supplied to the source-current-flowing voltage source, it is possible to stabilize an output potential of the voltage source serving as both the negative voltage source and the source-current-flowing voltage source. Therefore, using a MOSFET as a switching element for switching between voltage application terminals makes it possible to stabilize a constant voltage function of the source-current-flowing voltage source, while generating less heat, when a capacitive load is charged and discharged by alternately reversing the direction of a current.

Figure 18:
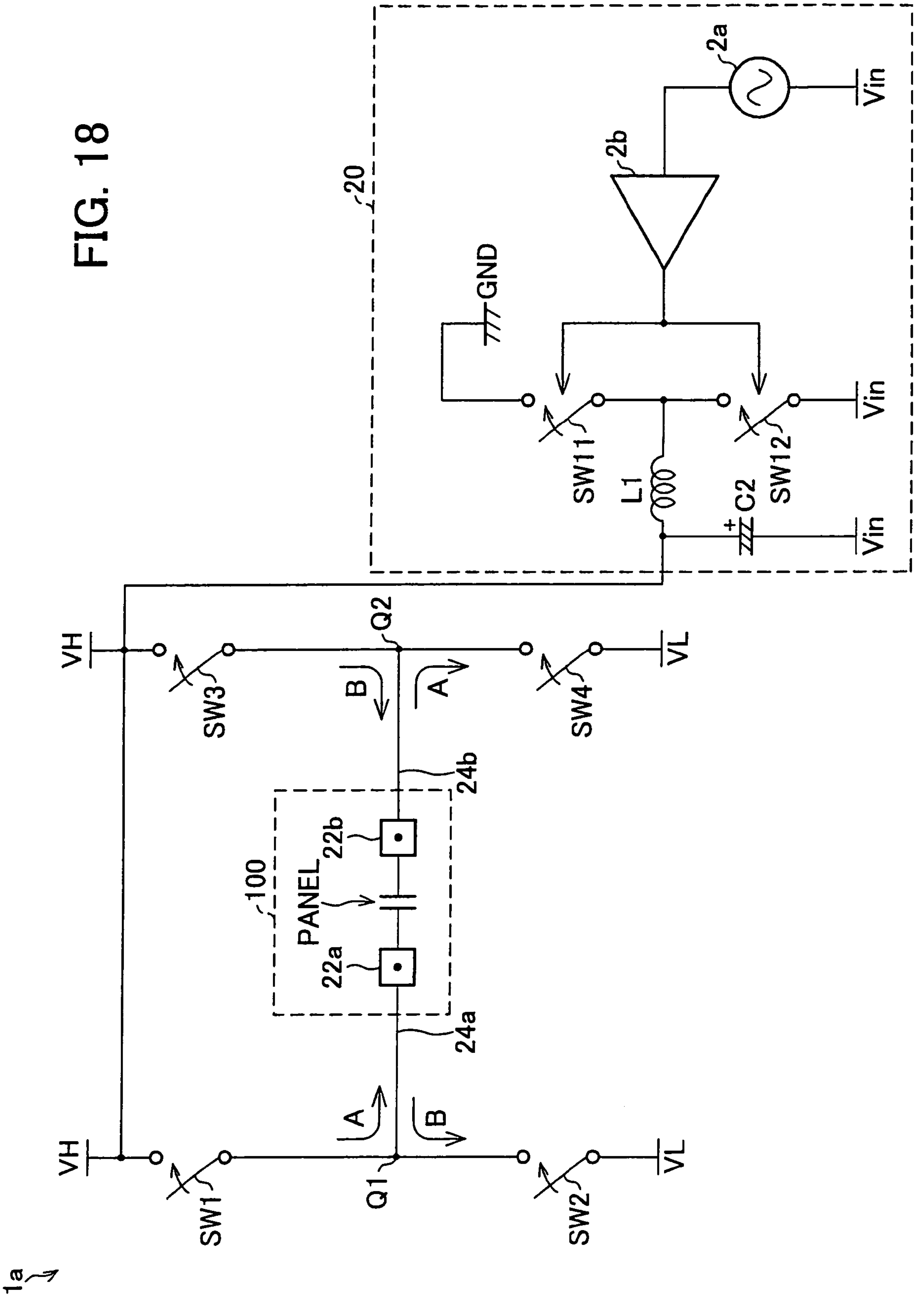
FIG. 18 is a circuit block diagram showing, as an embodiment of the present invention, a modification example of the pixel charge-discharge circuit of FIG. 1.

FIG. 18 shows an arrangement of a pixel charge-discharge circuit (capacitive load charge-discharge device) 1*a* in which a constant voltage source including stored energy adjusting means serves as both a negative voltage source and a source-current-flowing voltage source. The pixel charge-discharge circuit 1*a* is different from the pixel charge-discharge circuit 1 of FIG. 1 in that: the pixel charge-discharge circuit 1*a* includes a stored energy adjustment section (stored energy adjusting means) 20 arranged so that the voltage source Vin of the stored energy adjustment section 2 is replaced by a GND and the GND of the stored energy adjustment section 2 is replaced by a voltage source Vin. Further, an arrangement is such that provided between the voltage source VH and the voltage source Vin is a capacitor C2 whose positive terminal is connected to an output terminal of the stored energy adjustment section 20. However, there is a relation $Vin \leqq VL < VH < 0$. That is, the voltage source VH is a negative voltage source serving as both a high voltage source and a source-current-flowing voltage source, and the voltage source VL is a negative voltage source serving as a low voltage source.

Further, there may be provided plural types of positive voltage sources and negative voltage sources, and there may be provided both positive voltage sources serving as sink-current-flowing voltage sources and negative voltage sources serving as source-current-flowing voltage sources.

Further, a counter electrode COMMON of a liquid crystal display device may be considered as a capacitive load subjected to charging and discharging. In this case, it is only necessary to connect the connection point Q1 or Q2 to the counter electrode COMMON by using either the circuit of the switches SW1 and SW2 of FIG. 1 or the circuit of the switches SW3 and SW4 of FIG. 1. This makes it possible to stably perform alternating-current driving, which is performed by changing a potential of the counter electrode COMMON, by only using a homopolar voltage source.

Using the pixel charge-discharge circuit 1 according to the present embodiment makes it possible to achieve a multi-pixel driving liquid crystal display device which has high display quality.

Second Embodiment

According to the foregoing conventional arrangement (driving of FIGS. 13(*a*) to 13(*f*)), when certain gradations (halftone gradations) are displayed entirely on a display surface of a large-size high-resolution liquid crystal display device, there is such a problem that horizontal uneven-luminance streaks are generated. Reasons why the horizontal uneven-luminance streaks are generated will be described below with reference to FIGS. 2 and 3.

Figure 2:
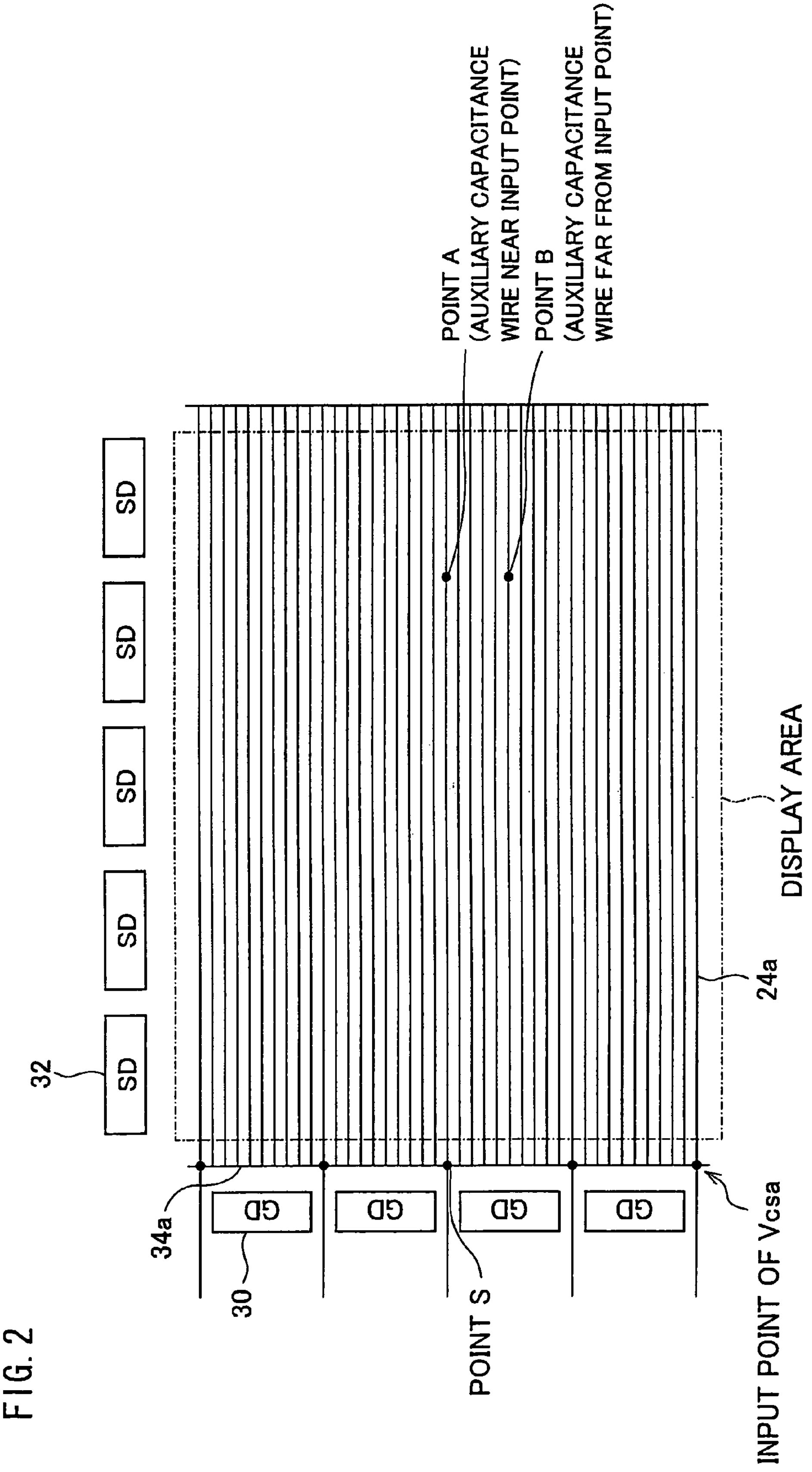
FIG. 2 is a plan view showing an arrangement of auxiliary capacitance wires installed in a liquid crystal display device which performs multi-pixel driving.

FIG. 2 is a plan view showing a positional relationship between driving drivers and auxiliary capacitance wires in a liquid crystal display device.

Figure 12:
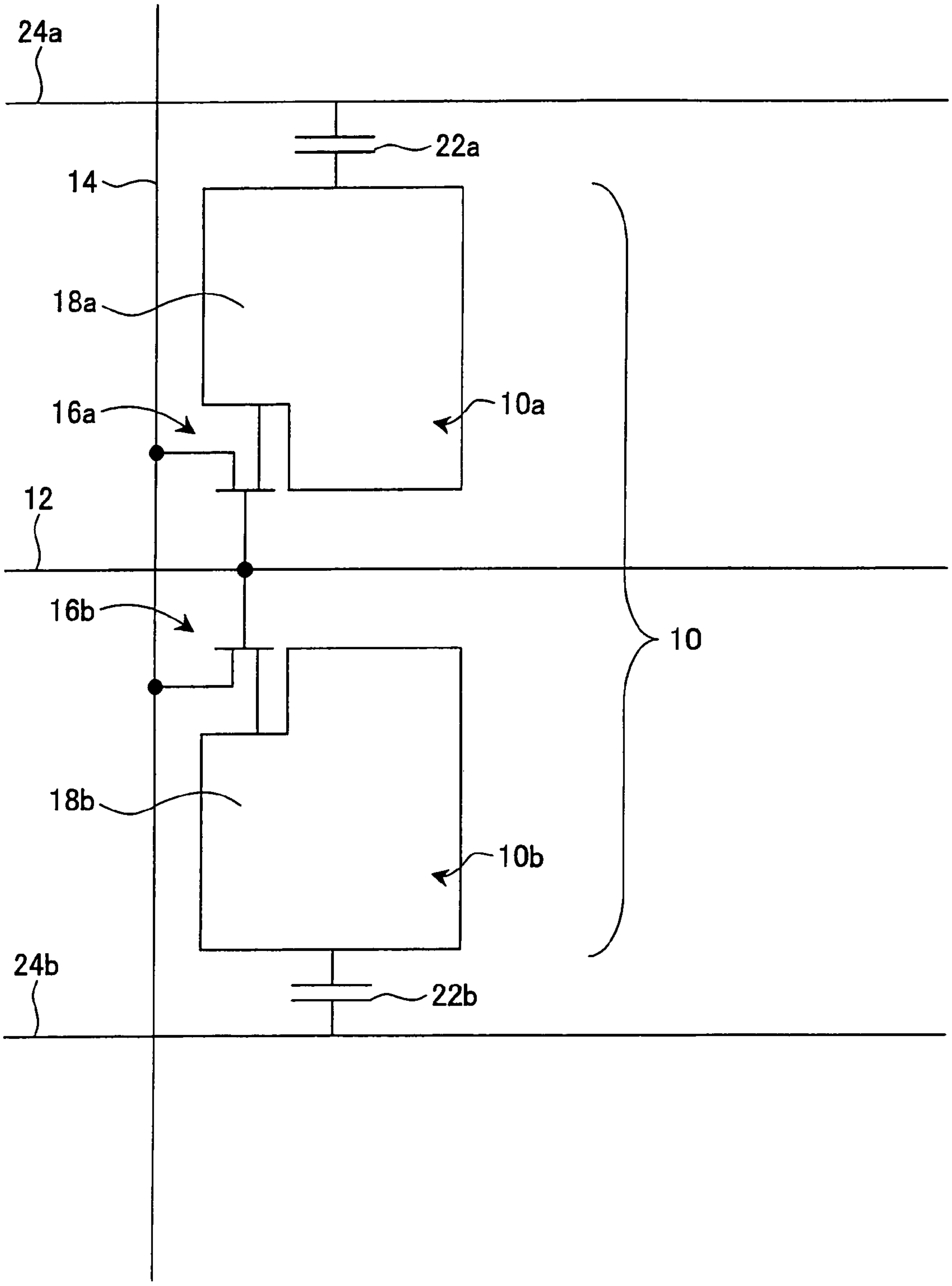
FIG. 12 is a diagram showing a pixel structure of a liquid crystal display device which performs multi-pixel driving.

Generally, as shown in FIG. 2, a plurality of separated drivers are used as gate drivers 30 and source drives 32 for driving a scanning line 12 (FIG. 12) and a signal line 14 (FIG. 12) of a display area of the large-size high-resolution liquid crystal display device. Note that the gate drivers 30 and the source drivers 32 are omitted in FIG. 2.

Further, all auxiliary capacitance wires 24*a* are connected to an auxiliary capacitor main line 34*a*. The auxiliary capacitor main line 34*a* receives a voltage Vcsa from several input points. Each of the input points of the voltage Vcsa is normally provided between two of the separated gate drivers 30. FIG. 2 shows an arrangement for applying the auxiliary capacitance voltage Vcsa to the auxiliary capacitance wires 24*a*, and an auxiliary capacitance voltage Vcsb is applied to auxiliary capacitance wires 24*b* according to the same arrangement.

Figure 3:
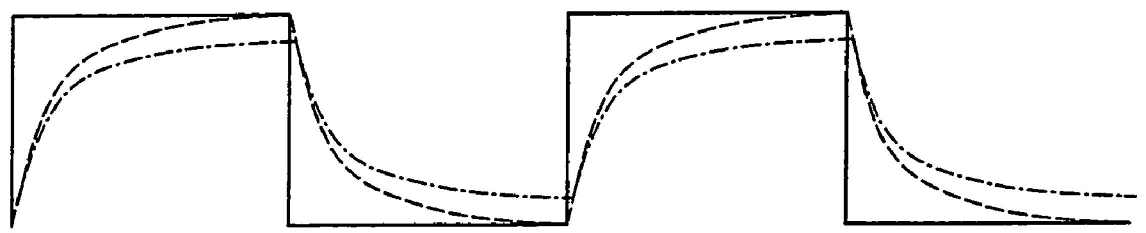
FIG. 3 is a waveform chart showing the degree to which voltage waveforms of the auxiliary capacitance wires are blunt.
Figure 4A:
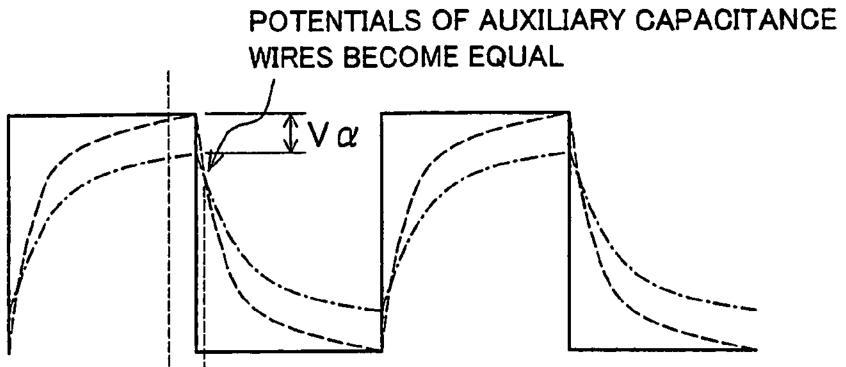
FIGS. 4(*a*) to 4(*e*) are waveform charts for explaining relationships between potential waveforms of the auxiliary capacitance wires and scanning signals.
Figure 4B:
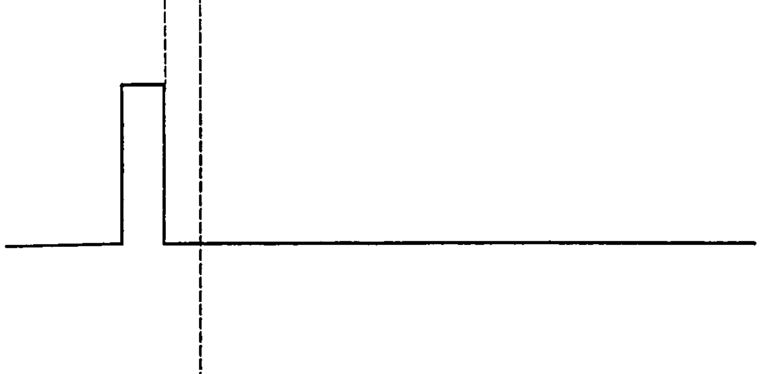
Figure 4C:
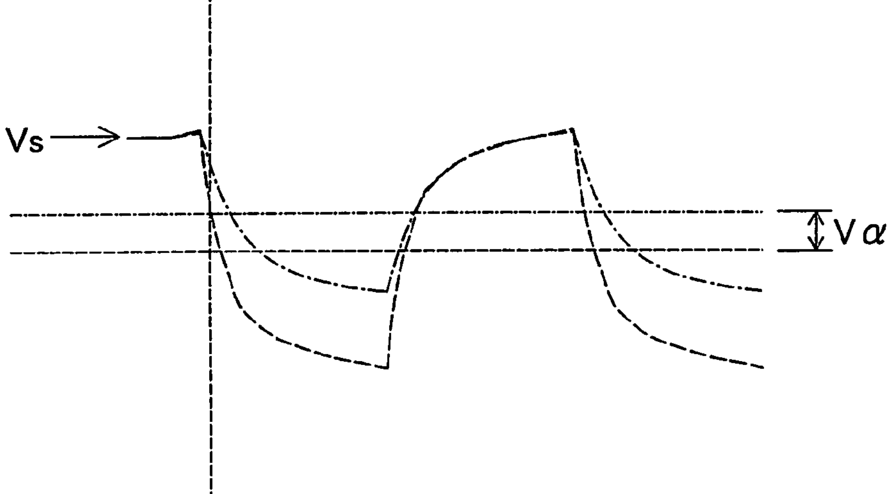
Figure 4D:
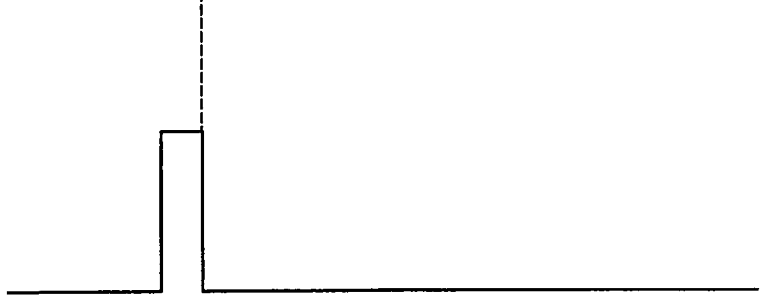
Figure 4E:
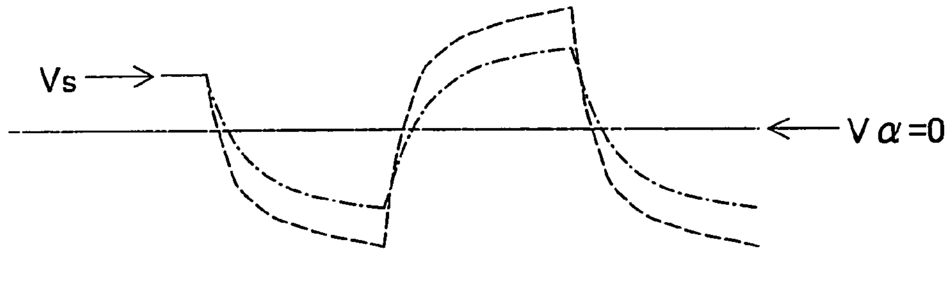

According to the arrangement shown in FIG. 2, a voltage waveform of that one of the auxiliary capacitance wires 24*a* which is far from the input point of the voltage Vcsa is blunter, as shown in FIG. 3, than a voltage waveform of that one of the auxiliary capacitance wires 24*a* which is near the input point of the voltage Vcsa due to an effect of an electrical load, such as a parasitic capacitance, generated between the auxiliary capacitance wire 24*a* which is far from the input point and that one of the auxiliary capacitance wires 24*a* which is next to it. Note that, in FIG. 3, a solid line indicates that driving waveform of the auxiliary capacitance wires which is supplied to the input point, and a dotted line indicates a voltage waveform of the auxiliary capacitance wire 24*a* which is near the input point, and a dashed line indicates a voltage waveform of the auxiliary capacitance wire 24*a* which is far from the input point.

Moreover, when a waveform of each of the auxiliary capacitance wires 24*a* varies depending on a distance between the auxiliary capacitance wire 24*a* and the input point as described above, a potential of each of the auxiliary capacitance wires 24*a* varies at a point of time when a gate of a TFT is put in an OFF state. Further, as described above, charges supplied to each pixel are influenced by the potential of the auxiliary capacitance wire 24*a*, so that variation in the potential of the auxiliary capacitance wire 24*a* leads to variation in a charging amount (the "variation in a charging amount" are distinguished from differences in a charging amount according to display gradations), and this generates the horizontal uneven-luminance streaks. Specifically, in a line corresponding to the auxiliary capacitance wire 24*a* which is near the input point of the voltage Vcsa, there occur horizontal streaks whose luminance is greatly different from that of other lines.

Accordingly, in the following, a technique for preventing the horizontal uneven-luminance streaks in a multi-pixel driving liquid crystal display device will be described. Thereafter, a series circuit 100 will be described.

A first arrangement will be described below with reference to FIGS. 4(*a*) and 4(*e*). A liquid crystal display device according to the first arrangement performs multi-pixel driving but is characterized by a driving signal thereof. An arrangement of the liquid crystal display device per se is the same as that of the conventional liquid crystal display device (of FIGS. 12 and 2). On this account, in the first arrangement, the arrangement of the liquid crystal display device is the same as the arrangements shown in FIGS. 12 and 2 and is described using the reference numerals of FIGS. 12 and 2.

First, the driving signal of the liquid crystal display device according to the first arrangement differs from the driving signal shown in FIGS. 13(*a*) to 13(*f*) in that a phase of an input signal (voltage waveform Vcsa) inputted into the auxiliary capacitance wire 24*a* and a phase of an input signal (voltage waveform Vcsb) inputted into the auxiliary capacitance wire 24*b* are controlled based on an OFF timing of a scanning signal (voltage waveform Vg) of the scanning line 12. That is, a voltage waveform Vs of the signal line 14 shown in FIG. 13(*a*) and a voltage waveform Vg of the scanning line 12 are related to each other in a conventional manner.

The technique for preventing the horizontal uneven-luminance streaks in the liquid crystal display device according to the first arrangement will be described below with reference to FIGS. 4(*a*) and 4(*e*). FIG. 4(*a*) shows that driving waveform (indicated by the solid line in the figure) of the auxiliary capacitance wires which is supplied to the input point (point S in FIG. 2), a voltage waveform (indicated by the dotted line in the figure) of the auxiliary capacitance wire 24*a* (point A in FIG. 2) which is near the input point, and a voltage waveform (indicated by the dashed line in the figure) of the auxiliary capacitance wire 24*a* (point B in FIG. 2) which is far from the input point. Further, FIG. 4(*b*) shows a scanning signal for the purpose of comparison, and the scanning signal corresponds to Vg of FIG. 13(*d*). FIG. 4(*c*) shows a voltage waveform obtained by superimposing onto a pixel electrode of a liquid crystal layer an oscillating voltage of the auxiliary capacitance wires indicated by the dotted or dashed line of FIG. 4(*a*) when a TFT element is turned OFF by the scanning signal of FIG. 4(*b*). FIG. 4(*c*) corresponds to FIGS. 13(*e*) and 13(*f*). FIG. 4(*d*) shows a scanning signal of the liquid crystal display device according to the first arrangement. FIG. 4(*e*) shows a voltage waveform obtained by superimposing onto the pixel electrode of the liquid crystal layer the oscillating voltage of the auxiliary capacitance wire indicated by the dotted or dashed line of FIG. 4(*a*) when the TFT element is turned OFF by the scanning signal of FIG. 4(*d*). FIG. 4(*e*) corresponds to FIGS. 13(*e*) and 13(*f*).

Note that, for that sake of convenience, each of FIGS. 4(*a*) to 4(*d*) shows two types of scanning signal waveforms with respect to a single auxiliary capacitance voltage waveform. However, in an actual liquid crystal display device, a scanning signal waveform is determined in conjunction with a signal line voltage waveform Vs, and the scanning signal waveform cannot be changed. Therefore, in order to optimize the phases of the voltage waveforms of the auxiliary capacitance wires based on the OFF timing of the scanning signal, a voltage of the auxiliary capacitance wires is changed.

First, a case is examined in which driving control is performed by using the scanning signal shown in FIG. 4(*b*). When the scanning signal shown in FIG. 4(*b*) is used, turning OFF a scanning signal of a scanning line 12 disconnects from the signal line 14 all pixels connected to the scanning line 12, thereby determining a charging amount. Further, at a point of time when the scanning signal is turned OFF, a potential of the auxiliary capacitance wire 24*a* which is near the input point and a potential of the auxiliary capacitance wire 24*a* which is far from the input point are different by Vα. At this time, according to FIG. 4(*c*), also as for an effective voltage of a pixel electrode onto which an oscillating voltage of the auxiliary capacitance wires has been superimposed, an effective voltage indicated by the dotted line (a voltage of a pixel electrode corresponding to the auxiliary capacitance wire 24*a* which is near the input point) and an effective voltage indicated by the dashed line (a voltage of a pixel electrode corresponding to the auxiliary capacitance wire 24*a* which is far from the input point) are different by Vα. Therefore, because the potential difference Vα between the auxiliary capacitance wires is reflected as a voltage difference applied to liquid crystal capacitors of sub-pixels connected to scanning lines, i.e., as a luminance difference between the sub-pixels, the potential difference Vα causes the horizontal uneven-luminance streaks.

Meanwhile, as shown also in FIG. 4(*a*), the waveform (dotted line) of the auxiliary capacitance wire 24*a* which is near the input point and the waveform (dashed line) of the auxiliary capacitance wire 24*a* which is far from the input point intersect with each other at a point during every inversion cycle. That is, there is a point of time at which the potential different Vα becomes 0. Moreover, as shown in FIG. 4(*d*), the liquid crystal display device according to the first arrangement is arranged so as to cause the intersection point of the waveforms, i.e., a phase timing at which the potentials of the auxiliary capacitance wires become equal, to coincide with an OFF timing of each scanning line. At this time, according to FIG. 4(*e*), effective voltages of pixel electrodes onto which oscillating voltages of the auxiliary capacitance wires have been superimposed are represented by the dotted line (indicating a voltage of an pixel electrode corresponding to the auxiliary capacitance wire 24*a* which is near the input point) and the dashed line (indicating a voltage of an pixel electrode corresponding to the auxiliary capacitance wire 24*a* which is far from the input point), and the effective voltages (indicated by the dotted line and the dashed line (the lines overlap each other)) coincide with each other. Therefore, there occur no horizontal uneven-luminance streaks.

As described above, as with the relations shown in FIGS. 4(*a*) and 4(*d*), the liquid crystal display device according to the first arrangement makes it possible to causes an OFF timing of a scanning signal to coincide with a phase timing at which potentials of auxiliary capacitance wires become equal so as to eliminate a voltage difference applied to a liquid crystal capacitor of a sub-pixel connected to each scanning line, thereby preventing the horizontal uneven-luminance streaks from occurring.

In the following, a second arrangement will be described. A binary oscillating voltage is used as a signal for driving the auxiliary capacitance wires in the first arrangement. However, when the arrangement is applied to an actual liquid crystal display device, there are such problems as described below.

That is, as evidenced by FIG. 4(*a*), each of the voltage waveform of the auxiliary capacitance wire 24*a* which is near the input point and the voltage waveform of the auxiliary capacitance wire 24*a* which is far from the input point has a steep slope near the intersection point. In this case, when a point of time at which a gate of a TFT is turned OFF due to a fall of a scanning signal slightly shifts from the intersection point, a potential difference is generated between the auxiliary capacitance wires, thereby generating horizontal uneven-luminance streaks. That is, there is only a very narrow timing margin in controlling a phase timing at which the potentials of the auxiliary capacitance wires become equal. Specifically, as a result of studying a timing margin by using a large-size and high-resolution liquid crystal display device, the inventors found that the timing margin during which the uneven luminance can be eliminated was approximately 0.12 μs (microseconds).

When the phase timing at which the potentials of the auxiliary capacitance wires become equal has the very narrow timing margin as described above, an adjustment step of causing the gate OFF timing to correspond to the timing margin becomes indispensable which results in a problem such as lower productivity. Further, even after the phase timing at which the potentials of the auxiliary capacitance wires become equal is made to correspond to the timing margin, the timing may fluctuate due to changes in use environment (temperature and other conditions), and it may become impossible to completely prevent uneven luminance from occurring.

Figure 5:
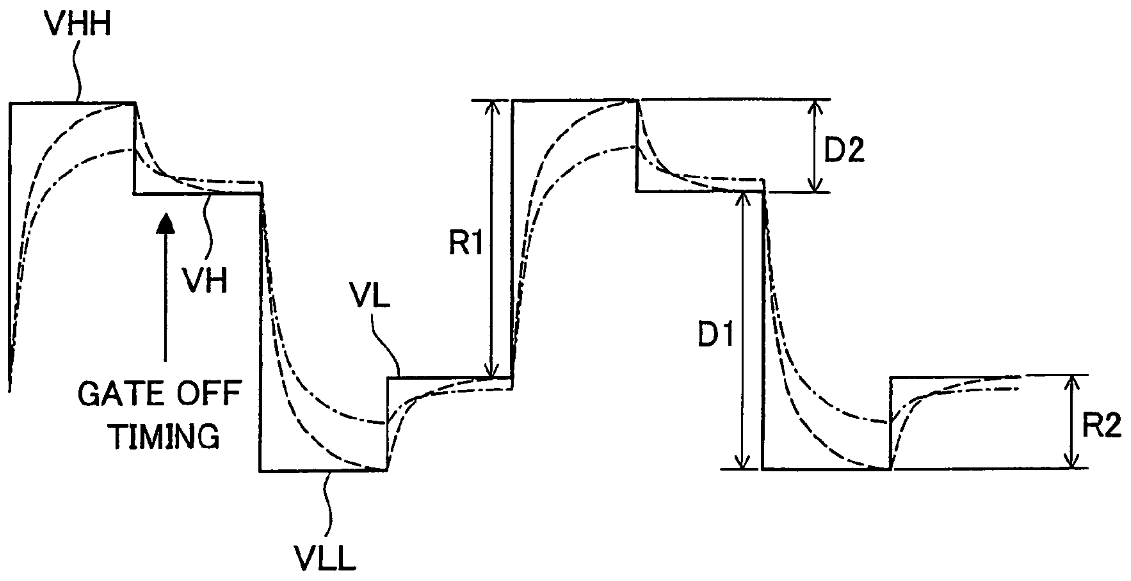
FIG. 5 is a waveform chart showing, when an application voltage signal applied to the auxiliary capacitance wires is a quarternary signal, the degree to which voltage waveforms of the applied voltage signal and the auxiliary capacitance wires are blunt.

As opposed to this arrangement, the liquid crystal display device according to the second arrangement is arranged so as to overcome the foregoing problems by increasing a margin of a gate OFF timing during which uneven luminance can be eliminated. For this reason, as shown in FIG. 5, the liquid crystal display device according to the second arrangement is arranged so as to use a quarternary oscillating voltage as a signal for driving the auxiliary capacitance wires. That is, according to the second arrangement, the signal for driving the auxiliary capacitance wires has four values VHH, VH, VLL, and VL (VHH>VH>VL>VLL>0) and changes in this order. Note that, also in FIG. 5, that driving waveform of the auxiliary capacitance wires which is supplied to the input point (point S in FIG. 2) is indicated by a solid line, and the voltage waveform of the auxiliary capacitance wire 24*a* (point A in FIG. 2) which is near the input point is indicated by a dotted line, and the voltage waveform of the auxiliary capacitance wire 24*a* (point B in FIG. 2) which is far away from the input point is indicated by a dashed line.

When the signal for driving the auxiliary capacitance wires is the quarternary signal shown in FIG. 5, the intersection point at which the voltage waveform of the auxiliary capacitance wire 24*a* (point A in FIG. 2) which is near the input point (point S in FIG. 2) and the waveform of the auxiliary capacitance wire 24*a* (point B in FIG. 2) which is far from the input point intersect with each other can necessarily be set between the voltages VHH and VH and between the voltages VLL and VL.

This is because the voltage waveform of the auxiliary capacitance wire 24*a* which is near the input point changes more rapidly than the voltage waveform of the auxiliary capacitance wire 24*a* which is far from the input point and has a larger rising amount per unit time and a larger falling amount per unit time. Therefore, at a point of time when a voltage change from VL to VHH (a voltage change in a rising direction) is completed, the voltage waveform (indicated by the dotted line) of the auxiliary capacitance wire 24*a* which is near the input point reaches a higher voltage than the voltage waveform (indicated by the dashed line) of the auxiliary capacitance wire 24*a* which is far from the input point. Thereafter, at a point of time a voltage change from VHH to VH (a voltage change in a falling direction) is completed, the voltage waveform (indicated by the dotted line) of the auxiliary capacitance wire 24*a* which is near the input point reaches a lower voltage than the voltage waveform (indicated by the dashed line) of the auxiliary capacitance wire 24*a* which is far from the input point. That is, the voltage waveform (indicated by the dotted line) of the auxiliary capacitance wire 24*a* which is near the input point and the voltage waveform (indicated by the dashed line) of the auxiliary capacitance wire 24*a* which is far from the input point intersect with each other during the voltage change from VHH to VH (falling change). Moreover, near the intersection point, each of the waveforms has a less steep slope than when the binary signal shown in FIGS. 4(*a*) to 4(*e*) is used, so that there is a wide timing margin during which the gate OFF timing is controlled.

This is because when an effect of an oscillating voltage waveform of the auxiliary capacitance wires on a voltage applied to a liquid crystal layer in multi-pixel driving is constant, the voltage change from VHH to VH in case of using the quarternary signal shown in FIG. 5 (i.e., the voltage change in a voltage change area in which the waveform indicated by the dotted line and the waveform indicated by the dashed line intersect with each other at the intersection period) is smaller than a rectangular-wave voltage change amount (amplitude) shown in FIG. 3. Accordingly, a voltage slope at time near the intersection point of the waveforms is less steep in case of using the quarternary signal of FIG. 5 than in case of using the rectangular wave of FIG. 3. The second arrangement positively utilizes the inevitable phenomenon.

As a result of studying the timing margin by using the same large-size and high-resolution liquid crystal display device as in the first arrangement based on the same criteria, the inventors confirmed that the timing margin during which the uneven luminance can be eliminated was expanded to approximately 1.2 μs, which is ten times as wide as 0.12 μs in case of using the binary signal.

Thus, the liquid crystal display device according to the second arrangement expands the timing margin so as to omit the adjustment step of causing the phase timing at which the potentials of the auxiliary capacitance wires become equal to correspond to the timing margin, thereby avoiding a problem such as lower productivity. Even when charging characteristics and other qualities fluctuate due to changes in use environment (temperature and other conditions), an effect of preventing uneven luminance is not impaired.

Figure 6:
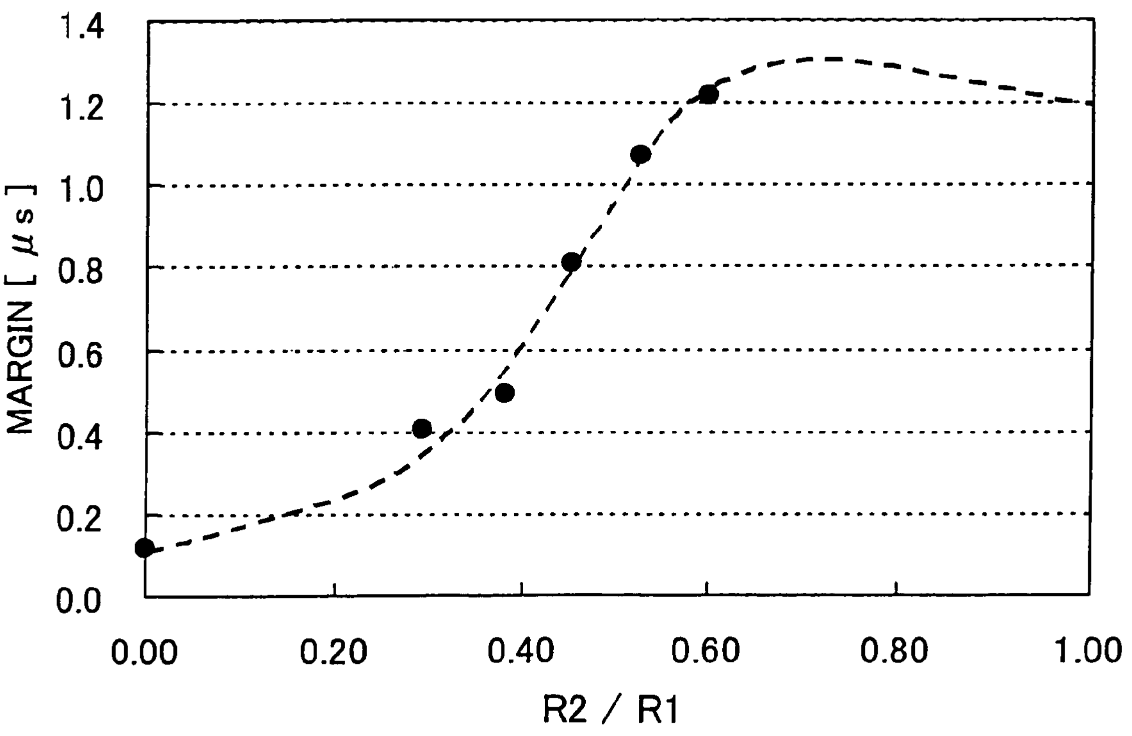
FIG. 6 is a graph showing a relationship between an index R2/R1 and a timing margin during which uneven luminance can be prevented.

Further, preferred examples of the driving waveform will be examined more in detail. In the second arrangement, as shown in FIG. 6, R1 represents an amount of rising potential change from the voltage VH to the voltage VHH in a driving signal of the auxiliary capacitance wires, and D1 represents an amount of falling potential change from the voltage VH to the voltage VLL. Further, D2(<D1) represents an amount of falling potential change from the voltage VHH to the voltage VH, and R2(<R1) represents an amount of rising potential change from the voltage VLL to the voltage VL. Note that each of the amounts of potential change R1, R2, D1, and D2 indicates an absolute value of a potential difference between a potential before change and a potential after change.

Here, R2/R1 is used as an index for quantitatively evaluating an effect of the second arrangement. Note that, in the second arrangement, the voltage change amount R1 is equal to the voltage change amount D1, and the voltage change amount R2 is equal to the voltage change amount D2. Further, in case of a conventional binary potential waveform, R2/R1 (=D2/D1)=0, assuming that each of R2 and D2 is 0. Further, even when the index R2/R1 is determined, the values of R1, R2, D1, and D2 are underspecified. Therefore, the values of R1, R2, D1, and D2 were adjusted so that the index R2/R1 is equal to a gradation level of 64/255 in case of using a binary potential waveform with an amplitude of 4 Vpp, i.e., so that an amount of pixel voltage change obtained by superimposing of an amplitude waveform of the auxiliary capacitance wires is constant. Of course, uneven-luminance streaks were evaluated with the gradation level of 64/255. Furthermore, the voltages VHH, VH, VL, and VLL in the quarternary voltage waveform were applied for the same period of time.

FIG. 6 is a graph showing a relationship between the index R2/R1 and the timing margin during which uneven luminance can be prevented. This graph shows an experimental result obtained from plural types of signals having various values of the index R2/R, and a display screen was checked with eyes so as to determine whether uneven luminance was prevented.

FIG. 6 shows that the greater the index R2/R1 is, the wider the timing margin is during which uneven luminance can be prevented. That is, it is suggested that an effective way of widening the timing margin as much as possible is to set a value of the index R2/R1 appropriately. Specifically, it is possible to obtain an effect when the index R2/R1 has a value of 0 or larger. The effect becomes apparent when the index R2/R1 has a value of 0.2 or larger. The effect becomes greater when the index R2/R1 has a value of 0.5 or larger. The inventors conducted an experiment under such conditions that the index R2/R1 was changed within a range of 0 to 0.6 (a filled circle "●" represents a point of time at which an experiment was conducted). The greatest effect was obtained when R2/R1=0.6. Note that the index R2/R1 was limited to the range of 0 to 0.6 in the experiment because of a range of output voltage of a driving circuit, not because of an essential limitation of the second arrangement.

Note that, as shown in FIG. 6, in the range (indicated by a solid line in FIG. 6) of the index R2/R1 within which the actual experiment was conducted, a larger value of the index R2/R1 means a wider timing margin. However, as indicated by a dotted line in FIG. 6, a further larger value of the index R2/R1 is expected to result in a narrower timing margin. This is because a larger value of R2/R1 means a larger amount of voltage change due to R2 (or D2), and it is expected that the waveform will have a rapid slope again near the intersection point at which the dotted line and the dashed line intersect with each other as shown in FIG. 5.

Figure 7:
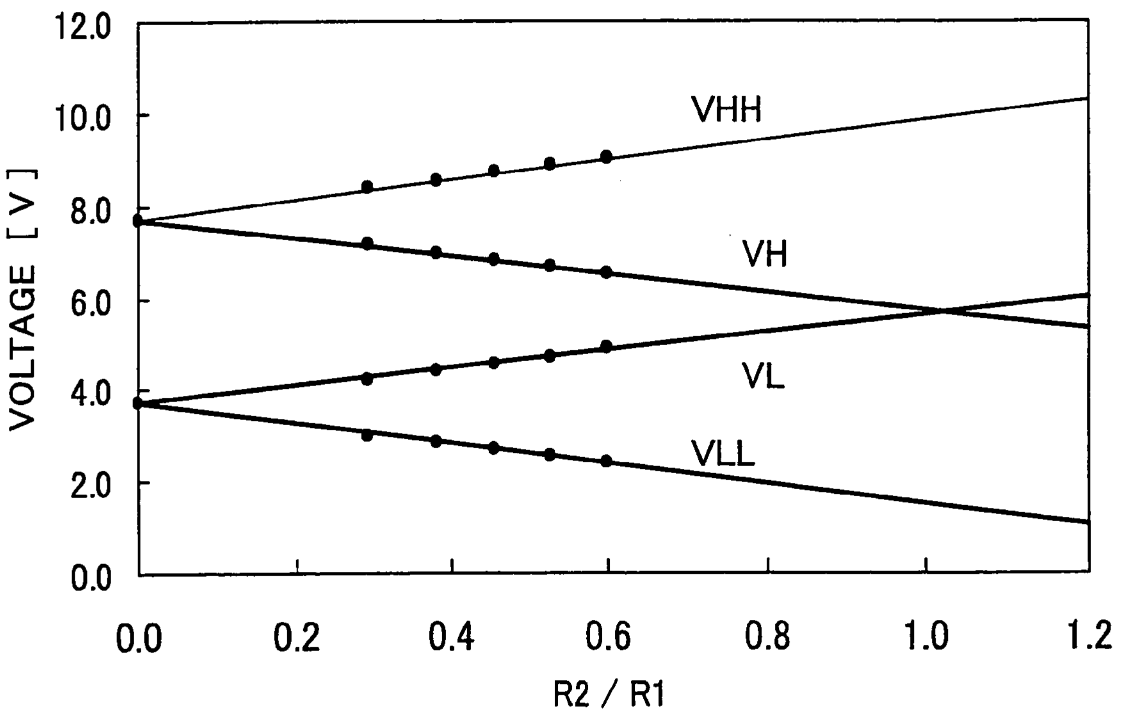
FIG. 7 is a graph showing a relationship of the index R2/R1 to VHH, VH, VL, and VLL in a case where an amount of pixel voltage change due to superimposition of amplitude waveforms of the auxiliary capacitance wires is adjusted to be constant in an experiment of FIG. 6.

FIG. 7 shows a value of each of VHH, VH, VL, and VLL in case of making adjustment so that an amount of pixel voltage change resulting from superimposing of the amplitude waveform of the auxiliary capacitance wires in the experiment of FIG. 6. According to FIG. 7, a relation VHH>VH>VL>VLL is satisfied in a range within which a value of R2/R1 lies within a range of approximately 0 to 1, the relation being a condition under which the effect of the second arrangement is obtained.

Accordingly, FIGS. 6 and 7 show that the effect of the second arrangement can be obtained when R2/R1 has a value not less than 0 and not more than 1, that the effect of the second arrangement can be obtained remarkably when R2/R1 has a value not less than 0.2 and not more than 1, and that the effect of the second arrangement can be obtained more remarkably when R2/R1 has a value not less than 0.5 and not more than 1.

Note that, in the second embodiment, although the voltages VHH, VH, VL, and VLL of the quarternary voltage waveform were applied for the same period of time, but the effect of the second arrangement is not to be limited to this arrangement. However, it is preferable for the following reasons that the voltages VHH, VH, VL, and VLL are applied for the same period of time. That is, it is preferable that: in the voltage waveform of the auxiliary capacitance wire 24*a*, a period of time corresponding to a voltage change of R1 (or D1) and a period of time corresponding to a voltage change of R2 (or D2) are equal. In the following, this point is considered with reference to FIG. 7. When a period of time during which the voltage waveform responds to the voltage change of R1 (or D1) is shorter than a period of time during which the voltage waveform responds to the voltage change D2 (or R2), the voltage of the auxiliary capacitance wires does not reach a voltage of VH or higher (or a voltage of VL or lower) due to the voltage change of R1 (or D1). In this case, it is inevitable that the second arrangement loses its essential effect. That is, there occurs no phenomenon that the voltage waveform (indicated by the dotted line in the figure) of the auxiliary capacitance wire 24*a* which is near the input point intersects with the voltage waveform (indicated by the dashed line in the figure) of the auxiliary capacitance wire 24*a* which is far away from the input point when the voltage waveforms respond to the voltage change of D2 (or R2). Conversely, also when a period of time during which the voltage waveform responds to the voltage change of D2 (or R2) is shorter than a period of time during which the waveform responds to R1 (or D1), a period of time during which the voltage of the auxiliary capacitance wires responds to the voltage change D2 (or R2). Therefore, the second arrangement loses its essential effect. That is, there occurs no phenomenon that the voltage waveform (indicated by the dotted line in the figure) of the auxiliary capacitance wire 24*a* which is near the input point intersects with the voltage waveform (indicated by the dashed line in the figure) of the auxiliary capacitance wire 24*a* which is far away from the input point when the voltage waveforms respond to the voltage change of D2 (or R2). Therefore, in the second arrangement, the voltages VHH, VH, VL, and VLL are applied for the same period of time. That is, it is preferable that the voltage waveform of each of the voltages through the auxiliary capacitance wire 24*a* respond to a voltage change of R1 (or D1) and a voltage change of R2 (or D2) for the same period of time.

Note that the liquid crystal display device according to the second arrangement is not limited in terms of shapes of sub-pixels and ratios of divided areas. For example, in terms of improving image quality of the display, it is preferable that a shape of a sub-pixel should not take the form of a rectangular.

In terms of improving viewing angle, it is more preferable to decrease an area of a pixel having a high luminance level than to divide the pixel at such a split ratio that the pixel is evenly divided.

As described above, according to the second arrangement, voltage displacement can be made gradual near the phase timing at which the potentials of all the auxiliary capacitance wires become equal, i.e., near the intersection point at which the voltage waveform of the auxiliary capacitance wire whose voltage waveform is less blunt intersects with the voltage waveform of the auxiliary capacitance wire whose voltage waveform is blunter. This makes it possible to widen a timing margin of an OFF timing of a switching element to be provided between each sub-pixel and a signal line.

In the following, charging and discharging of the series circuit 100 of the liquid crystal display device according to the second arrangement will be described.

Figure 8:
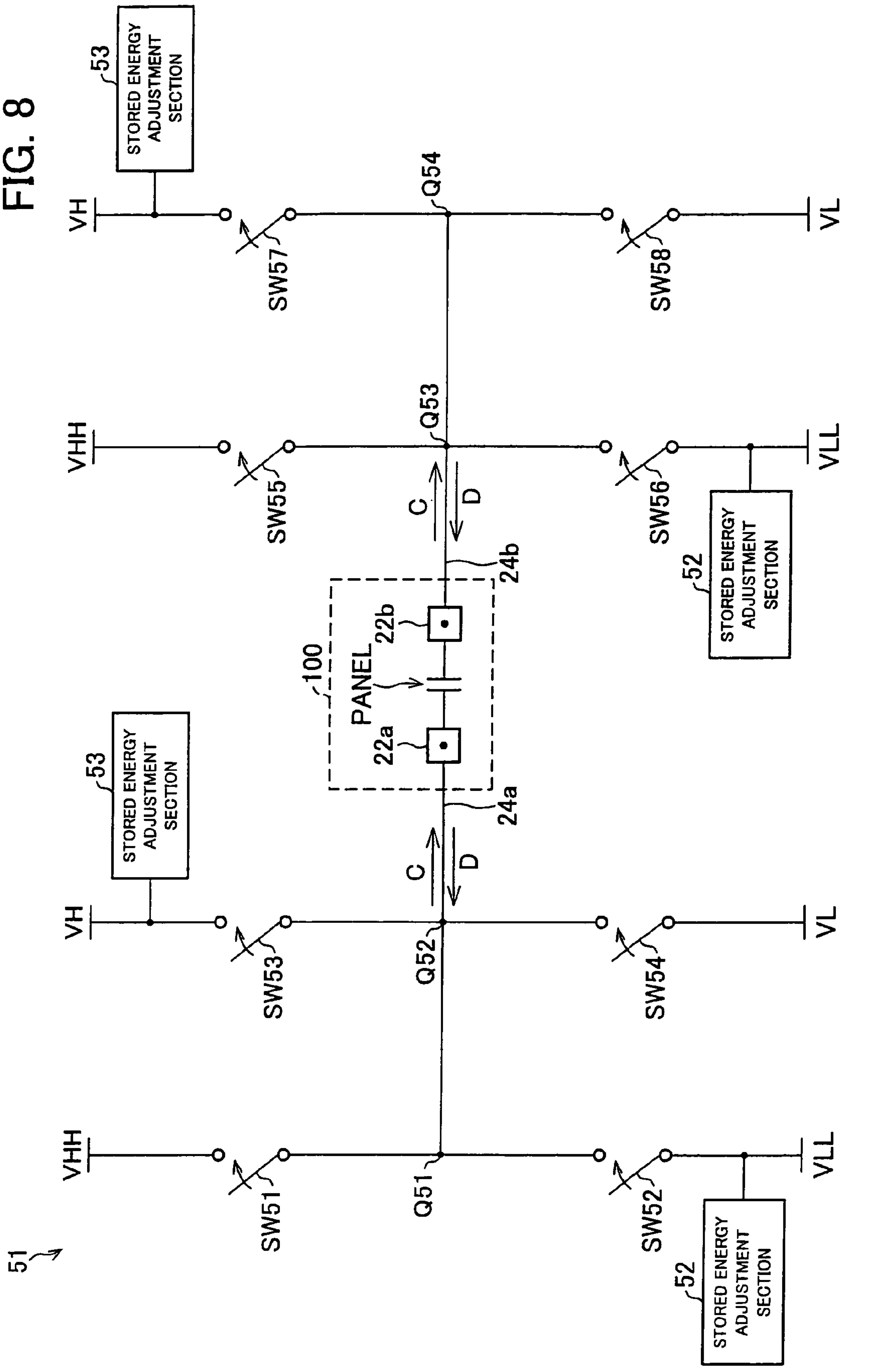
FIG. 8 is a circuit block diagram showing an arrangement of a pixel charge-discharge circuit according to another embodiment of the present invention.

FIG. 8 shows a single pixel of an arrangement of a pixel charge-discharge circuit (capacitive load charge-discharge device) 51 of the liquid crystal display device according to the second arrangement. Components given the same reference numerals as those in FIGS. 15 and 16 have the same functions unless otherwise noted.

The pixel charge-discharge circuit 51 includes a series circuit 100, auxiliary capacitance wires 24*a* and 24*b*, voltage sources VHH, VH, VL, and VLL serving as four types of constant voltage sources, switches SW51 to SW58, and stored energy adjustment sections 52 and 53.

In the pixel charge-discharge circuit 51, the switch SW51 and the switch SW52 are serially connected between the voltage source VHH and the voltage source VLL with the switch SW51 positioned on a side of the voltage source VHH. The switch 51 and the switch SW52 are connected at a connection point Q51, and the series circuit 100 includes an auxiliary capacitor 22*a* which has a terminal. Moreover, the connection point Q51 and the terminal of the auxiliary capacitor 22*a* are connected by the auxiliary capacitance wire 24*a*. Further, the switch SW53 and the switch SW54 are serially connected between the voltage source VH and the voltage source VL with the switch SW53 positioned on a side of the voltage source VH. The switch 53 and the switch SW54 are connected at a connection point Q52. Moreover, the connection point Q52 and the terminal of the auxiliary capacitor 22*a* are connected by the auxiliary capacitance wire 24*a*. Further, the switch SW55 and the switch SW56 are serially connected between the voltage source VHH and the voltage source VLL with the switch SW55 positioned on a side of the voltage source VHH. The switch 55 and the switch SW56 are connected at a connection point Q53, and the series circuit 100 includes an auxiliary capacitor 22*b* which has a terminal. Moreover, the connection point Q53 and the terminal of the auxiliary capacitor 22*b* are connected by the auxiliary capacitance wire 24*b*. Further, the switch SW57 and the switch SW58 are serially connected between the voltage source VH and the voltage source VL with the switch SW57 positioned on a side of the voltage source VH. The switch 57 and the switch SW58 are connected at a connection point Q54. Moreover, the connection point Q54 and the terminal of the auxiliary capacitor 22*b* are connected by the auxiliary capacitance wire 24*b*. In this way, the connection points Q51 to Q54 serve as voltage application terminals of the series circuit 100.

Further, the stored energy adjustment section (stored energy adjusting means) 52 is provided in the voltage source VH according to the same arrangement as in FIG. 1. However, an element constant of a coil L1, a size of a voltage Vin, a duty of a pulse from a pulse voltage source 2*a*, a cycle of the pulse, and other parameters are set in accordance with each of the voltage sources. In FIG. 8, voltage sources VHH, VH, VL, and VLL are respectively identical with other voltage sources VHH, VH, VL, and VLL. Potentials of the voltage sources are arranged in an order of VHH>VH>VL>VLL>0, and the voltage sources are all positive voltage sources. The voltage sources VHH and VH are high voltage sources, and the voltage sources VL and VLL are low voltage sources. Further, the voltage source VHH is a first high voltage source, and the voltage source VH is a second high voltage source. Further, the voltage source VLL is a first low voltage source, and the voltage source VL is a second voltage source. The series circuit 100 is charged and discharged by one of the high voltage sources and one of the low voltage sources. Here, however, the series circuit 100 is charged and discharged by a combination of the voltage source VHH and the voltage source VLL and a combination of the voltage source VH and the voltage source VL. According to the second arrangement, however, although a current flows from the voltage source serving as the first high voltage source through the series circuit 100 into the voltage source VLL serving as the first low voltage source as described later, the current does not flow from the voltage source VH serving as the second high voltage source through the series circuit 100 into the voltage source VL serving as the second low voltage source, but flows from the voltage source VL through the series circuit 100 into the voltage source VH.

Figure 9:
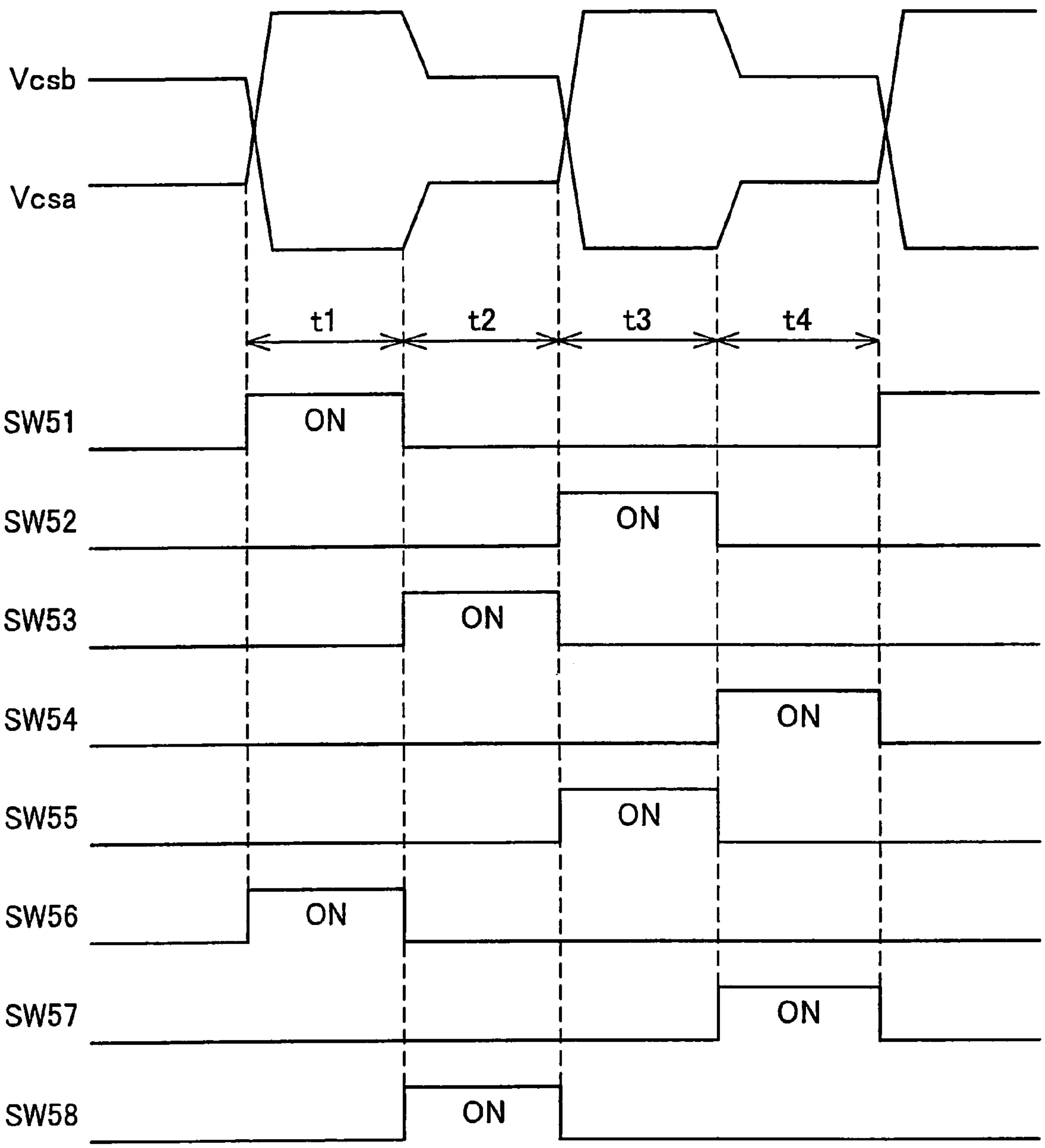
FIG. 9 is a timing chart showing a relationship between a change in potential of auxiliary capacitance wires of the pixel charge-discharge circuit of FIG. 8 and ON/OFF states of switches.

In the pixel charge-discharge circuit 51, the potential Vcsa of the auxiliary capacitance wire 24*a* is changed as described above in FIG. 5, and the potential Vcsb of the auxiliary capacitance wire 24*b* is an inverted potential of FIG. 5 centering around the potential of the counter electrode COMMON. FIG. 9 shows a relationship between changes of the potentials Vcsa and Vcsb and ON/OFF states of the switches SW51 to 56. In a first period t1, the switches SW 51 and SW56 are put in an ON state, and the other switches are put in an OFF state. At this time, a current flows from the power voltage VHH through the connection point Q5, the auxiliary capacitance wire 24*a*, the series circuit 100, the auxiliary capacitance wire 24*b*, and the connection point Q52 into the voltage source VLL (in a direction C of FIG. 8). Therefore, the voltage source VLL serves as both a positive voltage source and a sink-current-flowing voltage source, but because the stored energy adjustment section 52 discharges electrostatic energy of the voltage source VLL, an output potential of the voltage source VLL is stabilized. In the first period t1, the auxiliary capacitance wire 24*a* has the potential VHH, and the auxiliary capacitance wire 24*b* has the potential VLL. Next, in a second period t2, the switches SW53 and SW58 are put in an ON state, and the other switches are put in an OFF state. At this time, a current flows from the voltage source VL through the connection point Q54, the auxiliary capacitance wire 24*b*, the series circuit 100, the auxiliary capacitance wire 24*a*, and the connection point Q52 into the voltage source VH (in a direction D of FIG. 8). Therefore, the voltage source VH serves as both a positive voltage source and a sink-current-flowing voltage source, but because the stored energy adjustment section 53 discharges electrostatic energy of the voltage source VH, an output potential of the voltage source VH is stabilized. In the second period t2, the auxiliary capacitance wire 24*a* has the potential VH, and the auxiliary capacitance wire 24*b* has the potential VL.

Next, in a third period t3, the switches SW52 and SW55 are put in an ON state, and the other switches are put in an OFF state. At this time, a current flows from the voltage source VHH through the connection point Q53, the auxiliary capacitance wire 24*b*, the series circuit 100, the auxiliary capacitance wire 24*a*, and the connection point 51 into the voltage source VLL (in the direction D of FIG. 8). Therefore, the voltage source VLL serves as both a positive voltage source and a sink-current-flowing voltage source, but because the stored energy adjustment section 52 discharges the electrostatic energy of the voltage source VLL, the output potential of the voltage source VLL is stabilized. In the third period t3, the auxiliary capacitance wire 24*a* has the potential VLL, and the auxiliary capacitance wire 24*b* has the potential VHH. Next, in a fourth period t4, the switches SW54 and SW57 are put in an ON state, and the other switches are put in an OFF state. At this time, a current flows from the voltage source VL through the connection point Q52, the auxiliary capacitance wire 24*a*, the series circuit 100, the auxiliary capacitance wire 24*b*, and the connection point Q54 into the voltage source VH (in the direction C of FIG. 8). Therefore, the voltage source VH serves as both a positive power and a sink-current-flowing voltage source, but because the stored energy adjustment section 53 discharges the electrostatic energy of the voltage source VH, the output potential of the voltage source VH is stabilized. In the fourth period t4, the auxiliary capacitance wire 24*a* has the potential VL, and the auxiliary capacitance wire 24*b* has the potential VH.

In the pixel charge-discharge circuit 51, the first to fourth periods are repeated. However, the sub-pixel electrodes 18*a* and 18*b* and the electrodes of the auxiliary capacitors 22*a* and 22*b* connected to the sub-pixel electrodes 18*a* and 18*b* exchange charges with the signal line 14 in a selection period.

Thus, according to the present embodiment, the pixel charge-discharge circuit 51 includes the stored energy adjustment sections 52 and 53, and the stored energy adjustment sections 52 and 53 discharge electrostatic energy, which is supplied from the series circuit 100 to the voltage sources VLL and VH so as to be increased, in an appropriate period during which the switches SW11 and SW12 are put in an ON state, so that the electrostatic energy of the voltage sources VLL and VH leans toward a negative side. When this adjustment of the electrostatic energy causes the energy supplied to the voltage sources VLL and VH to be balanced by the energy discharged from the voltage source VLL and VH, it is possible to stabilize the output potentials of the voltage sources VLL and VH serving as both positive voltage sources and sink-current-flowing voltage sources. Therefore, using MOSFETs like those of FIG. 16 as the switches SW51 to SW58 for switching between the voltage application terminals makes it possible to stabilize a constant voltage function of each of the voltage sources VLL and VH, while generating less heat, when the series circuit 100 is charged and discharged by alternately reversing the direction of a current.

This makes it possible to accurately control a potential of each sub-pixel in a quarternary multi-pixel driving liquid crystal display device which reduces viewing angle dependency of gamma characteristics.

According to the present arrangement, the constant voltage sources are four types of constant voltage sources having different output potentials. Generally, however, there only needs to be plural types of constant voltage sources having different output potentials. Further, the stored energy adjustment sections 52 and 53 cause the stored energy of the capacitors of the voltage sources VLL and VH to lean toward a negative side but may also cause the stored energy to lean toward a positive side. The stored energy adjustment sections 52 and 53 only needs to be able to cause the stored energy to lean at least toward a negative side.

Further, a constant voltage source including stored energy adjusting means may be a negative voltage source serving as a source-current-flowing voltage source. In case of the negative source-current-flowing voltage source, the stored energy adjusting means only need to be able to at least replenish energy stored in the source-current-flowing voltage source so as to cause the stored energy to lean toward a positive side. When this adjustment of the stored energy causes the energy discharged from the source-current-flowing voltage source to be balanced by the energy supplied to the source-current-flowing voltage source, it is possible to stabilize an output potential of the voltage source serving as both a negative voltage source and a source-current-flowing voltage source. Therefore, using a MOSFET as a switch element for switching between voltage application terminals makes it possible to stabilize a constant voltage function of the source-current-flowing voltage source, while generating less heat, when a capacitive load is charged and discharged by alternately reversing the direction of a current.

Further, there may be provided plural types of positive voltage sources and negative voltage sources, and there may be provided both positive voltage sources serving as sink-current-flowing voltage sources and negative voltage sources serving as source-current-flowing voltage sources.

When the constant voltage sources are negative voltage sources which come in four types, including (i) a constant voltage source which has the highest potential serves as a first high voltage source, (ii) a constant voltage source which has the second highest potential and serves as a second high voltage source, (iii) a constant voltage source which has the lowest potential and serves as a first low voltage source, and (iv) a constant voltage source which has the second lowest potential and serves as a second low voltage source, the first high voltage source and the second low voltage source both of which are negative voltage sources include stored energy adjusting means, so that it is possible to stabilize output potentials of the first high voltage source and the second low voltage source both of which serve as source-current-flowing voltage sources. When the constant voltage sources are three types of positive voltage sources and one type of negative voltage source, the second high voltage source serving as a positive supply include stored energy adjusting means, so that it is possible to stabilize an output potential of the second high voltage source serving as a sink-current-flowing voltage source. When the constant voltage sources are one type of positive voltage source and three types of negative voltage sources, the second low voltage source serving as a negative voltage source includes stored energy adjusting means, so that it is possible to stabilize an output potential of the second low voltage source serving as a source-current-flowing voltage source. When the constant voltage sources are two types of positive voltage sources and two types of negative voltage source, the second high voltage source serving as a positive voltage source and the second low voltage source serving as a negative voltage source include stored energy adjusting mean, so that it is possible to stabilize output potentials of the second high voltage source serving as a sink-current-flowing voltage source and the second low voltage source serving as a source-current-flowing voltage source.

Further, as a constant voltage source which charges and discharges the series circuit 100, in general, a capacitive load charge-discharge device can be considered which is arranged so as to include first to n-th high voltage sources in a descending order of potential and first to n-th low voltage sources in an ascending order to potential. In this case, the series circuit 100 is charged and discharged by connecting the auxiliary capacitance wires 24*a* and 24*b* to the voltage sources in a switching manner so that the auxiliary capacitance wire 24*b* is connected to a k-th (k=1~n) low voltage source while the auxiliary capacitance wire 24*a* is connected to a k-th high voltage source and the auxiliary capacitance wire 24*b* is connected to the k-th (k=1~n) high voltage source while the auxiliary capacitance wire 24*a* is connected to the k-th low voltage source.

In a period during which a positive voltage source whose output potential is lower than that in the immediately preceding period is connected to the same auxiliary capacitance wire, the voltage source serves as a sink-current-flowing voltage source. Further, in a period during which a positive voltage source whose output potential is higher than that in the immediately preceding period is connected to the same auxiliary capacitance wire, the voltage source serves as a source-current-flowing voltage source. Therefore, when there are a voltage source serving as both a positive voltage source and a sink-current-flowing voltage source and a voltage source serving as both a negative voltage source and a source-current-flowing voltage source according to an order in which the power supplies are connected to the auxiliary capacitance wires 24*a* and 24*b*, the voltage sources are provided with stored energy adjusting means, so that it is possible to stabilize output potentials of the voltage sources.

This makes it possible to accurately control a potential of each sub-pixel in a 2n-value multi-pixel driving liquid crystal display device which reduces viewing angle dependency of gamma characteristics.

Further, as the capacitive load which is charged and discharged, the counter electrode COMMON of the liquid crystal display device can be used. In this case, the circuit of the switches SW51, SW52, SW53, SW54 may be used to connect the connection points Q51 and Q52 to the counter electrode COMMON. Alternatively, the circuit of the switches SW55, SW56, SW57, and SW58 may be used to connect the connection points Q53 and Q54 to the counter electrode COMMON. This makes it possible to stably perform alternating-current driving, which is performed by changing a potential of the counter electrode COMMON, by using only a homopolar voltage source.

Figure 10:
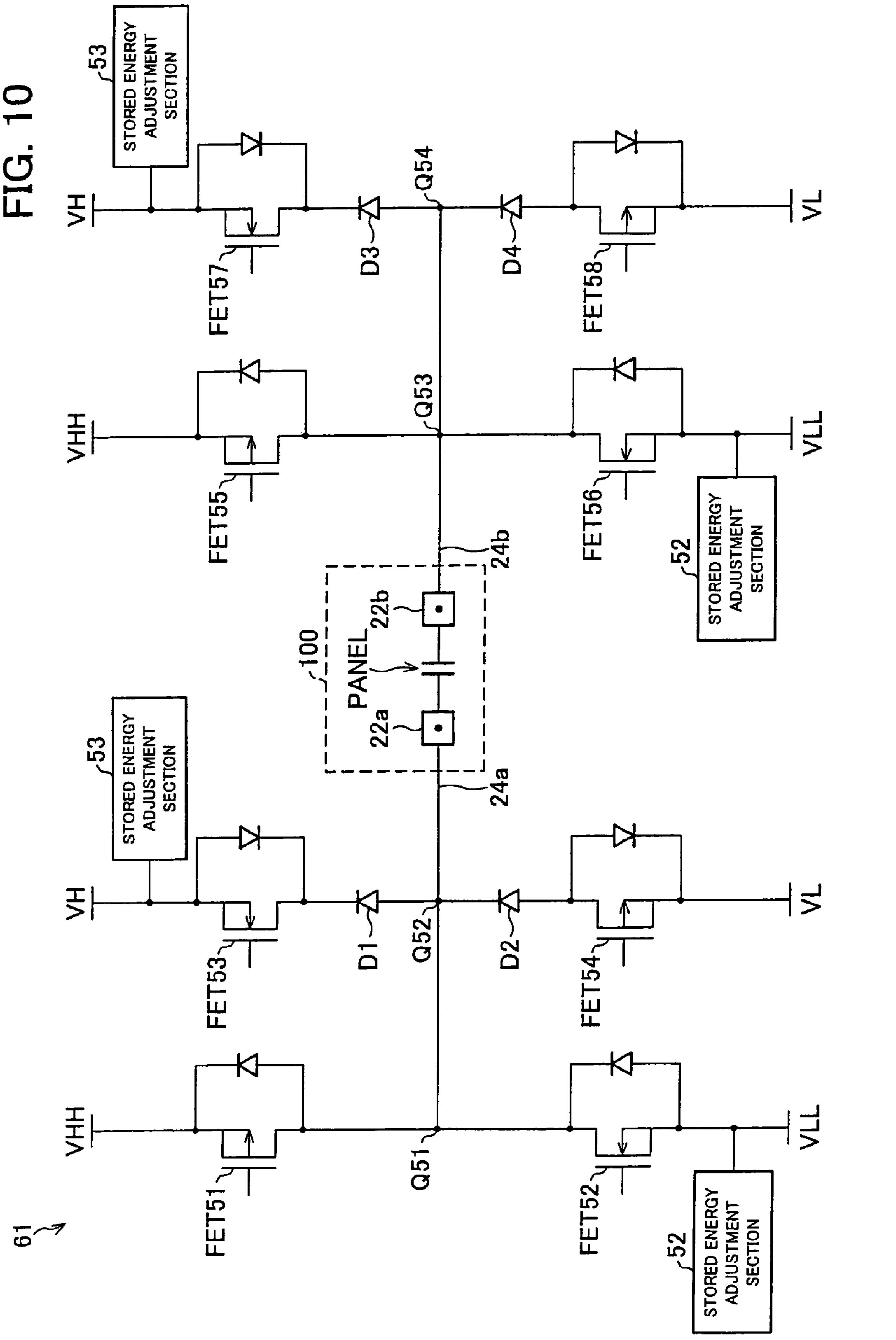
FIG. 10 is a circuit block diagram showing a more concrete arrangement of the pixel charge-discharge circuit of FIG. 8.
Figure 11:
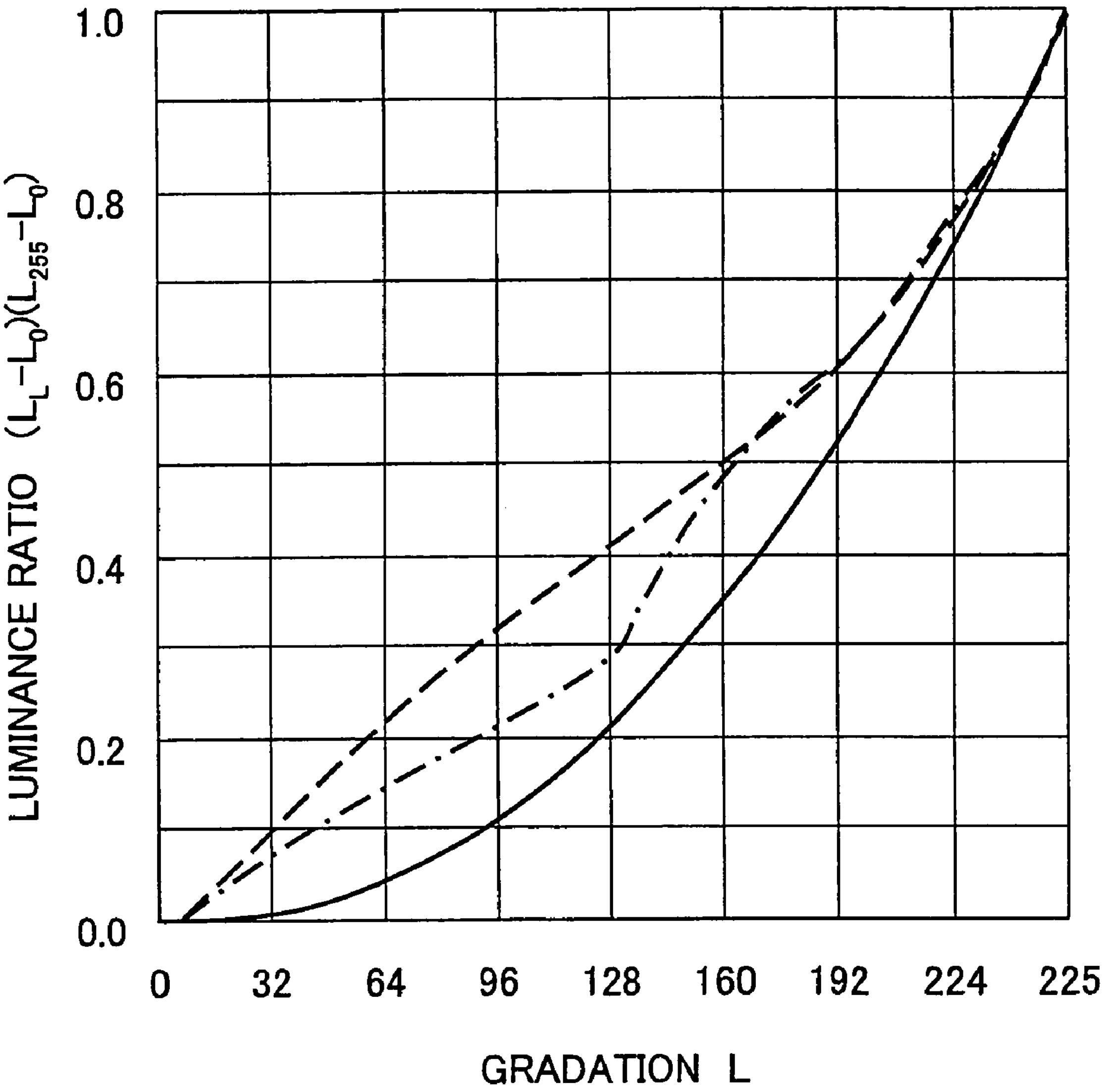
FIG. 11 is a graph showing gradation-luminance characteristics in normal driving and multi-pixel driving.

Next, FIG. 10 shows an arrangement of a pixel charge-discharge circuit 61 improved by using MOSFETs as the switches SW51 to SW58 of FIG. 8.

In the pixel charge-discharge circuit 61 of FIG. 10, the switches SW51 to SW58 of the pixel charge-discharge circuit 51 of FIG. 8 are replaced in this order by transistors FET51 to FET58. The transistors FET51, FET54, FET55, and FET58 are P-channel MOSFETs, and the transistors FET52, FET53, FET56, and FET57 are N-channel MOSFETs. The P-channel and N-channel transistors are chosen in view of the current flow direction so that a gate-source voltage is constant while the switches are in an ON state, and each of the transistors has a source on a voltage source side.

However, when the source of the P-channel transistor is connected to a substrate, that is, when the source and a doping region provided with a channel are connected by an electrode so as to have the same potential, the P-channel transistor has a parasitic diode arranged in a forward direction from a drain to the source. When the source of the N-channel transistor is connected to the substrate, the N-channel transistor has a parasitic diode positioned in a reverse direction from the source to a drain. Accordingly, a diode D1 is inserted between the connection point 52 and the transistor FET53 so as to be positioned in a reverse direction from the transistor FET53 to the connection point Q52. Further, a diode D2 is inserted between the transistor FET54 and the connection point Q52 so as to be positioned in a reverse direction from the connection point Q52 to the transistor FET54. Further, a diode D3 is inserted between the connection point Q54 and the transistor FET57 so as to be positioned in a reverse direction from the transistor FET57 to the connection point Q54. Further, a diode D4 is inserted between the connection point Q54 and the transistor FET58 so as to be positioned in a reverse direction from the connection point Q54 to the transistor FET58. In this way, in each period during which the series circuit 100 is charged and discharged, the diodes D1 to D4 prevent a current from flowing from an inactive voltage source (meaning a voltage source which is not used for charging and discharging) through a parasitic diode into a voltage source having a lower potential and prevent the current from flowing from a voltage source having a higher potential through the parasitic diode into the inactive voltage source. For example, from the first period t1 to the third period t3, it is possible to prevent a current from flowing from the connection point Q52 through a parasitic diode of the transistor FET54 into the voltage source VL. Further, in the first period t1, the third period t3, and the fourth period t4, it is possible to prevent a current from flowing from the connection point Q54 through a parasitic diode of the transistor FET58 into the voltage source VL.

According to the pixel charge-discharge circuit 61 of FIG. 10, a charge-discharge current of the series circuit 100 can be accurately used for charging and discharging, so that potentials of the sub-pixel electrodes 18*a* and 18*b* can be accurately controlled.

In general, a pixel charge-discharge circuit includes: n types of high voltage sources and n types of low voltage sources as constant voltage sources; and a MOSFET for connecting and disconnecting each of the auxiliary capacitance wires 24*a* and 24*b* to and from each of the constant voltage sources, the pixel charge-discharge circuit including (i) a diode inserted between the MOSFET and the auxiliary capacitance wires 24*a* and 24*b* so as to be positioned in a reverse direction from a high-potential sink-current-flowing voltage source to the auxiliary capacitance wire 24*a* or 24*b*, the MOSFET connecting and disconnecting the high-potential sink-current-flowing voltage source, which is the constant voltage source serving as both the high voltage source and the sink-current-flowing voltage source, and (ii) a diode inserted between the MOSFET and the auxiliary capacitance wires 24*a* and 24*b* so as to be positioned in a reverse direction from the auxiliary capacitance wire 24*a* or 24*b* to a low-potential source-current-flowing voltage source, the MOSFET connecting and disconnecting the low-potential source-current-flowing voltage source, which is the constant voltage source serving as both the low voltage source and the source-current-flowing voltage source.

Using the pixel charge-discharge circuits 51 and 61 according to the present embodiment makes it possible to achieve a multi-pixel driving liquid crystal display device which has high display quality.

In the following, modifications of the pixel charge-discharge circuit 61 of FIG. 10 will be described.

Figure 19:
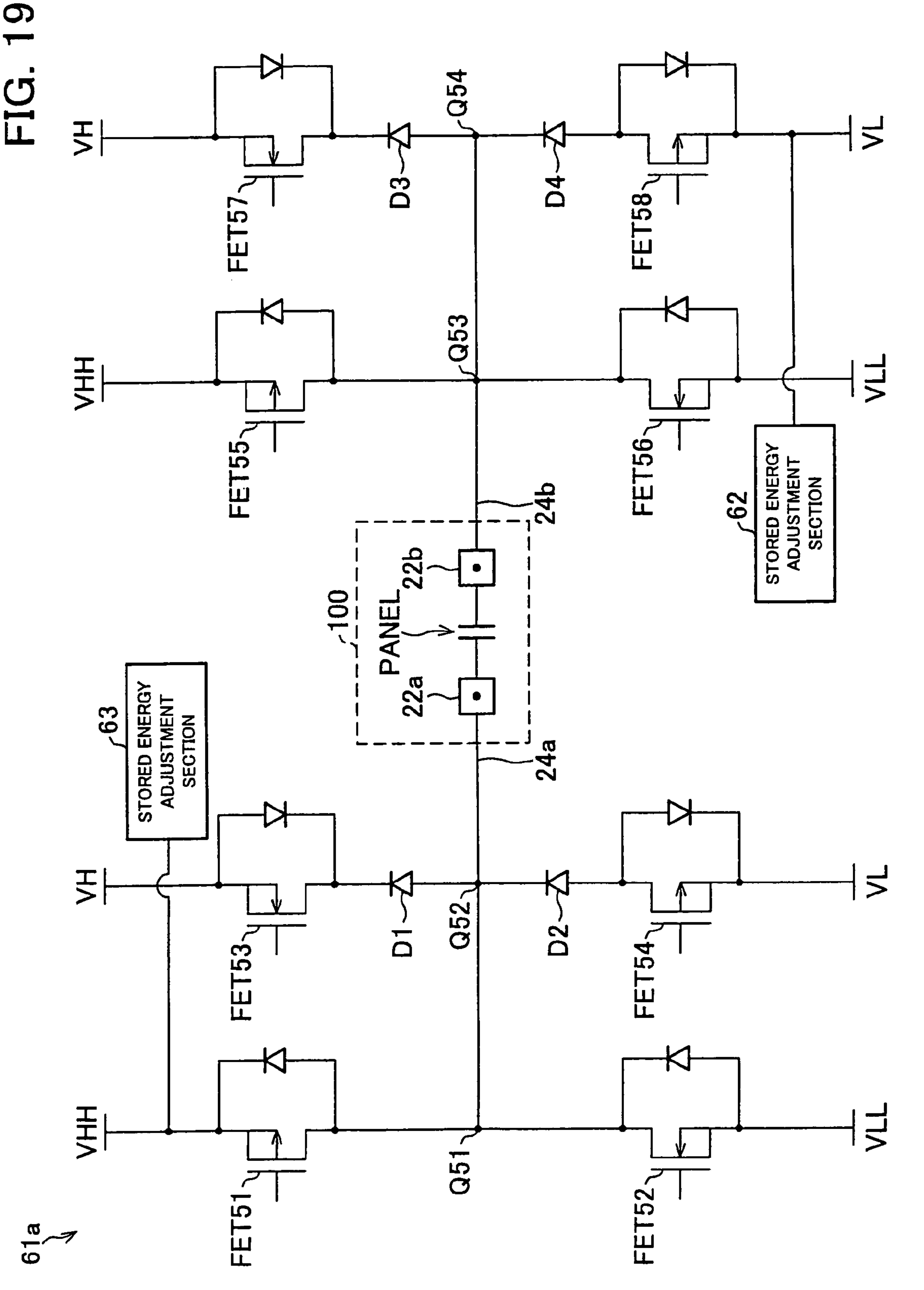
FIG. 19 is a circuit block diagram showing, as an embodiment of the present invention, a first modification example of the pixel charge-discharge circuit of FIG. 10.

FIG. 19 shows an arrangement of a pixel charge-discharge circuit 61*a* arranged so that all of the four types of voltage sources VHH, VH, VL, and VLL of FIG. 10 are negative voltage sources. The voltage source VHH is a first high voltage source, and the power supple VH is a second high voltage source. The voltage source VLL is a first low voltage source, and the voltage source VL is a second low voltage source. That is, the voltage sources have potentials represented by the following relation: VLL<VL<VH<VHH<0. Further, the voltage source VL is provided with a stored energy adjustment section (stored energy adjusting means) 62, and the voltage source VHH is provided with a stored energy adjustment section (stored energy adjusting means) 63. Each of the stored energy adjustment sections 62 and 63 has the same arrangement as the stored energy adjustment section 20. The series circuit 100 is charged and discharged in the same way as in FIG. 10.

Figure 20:
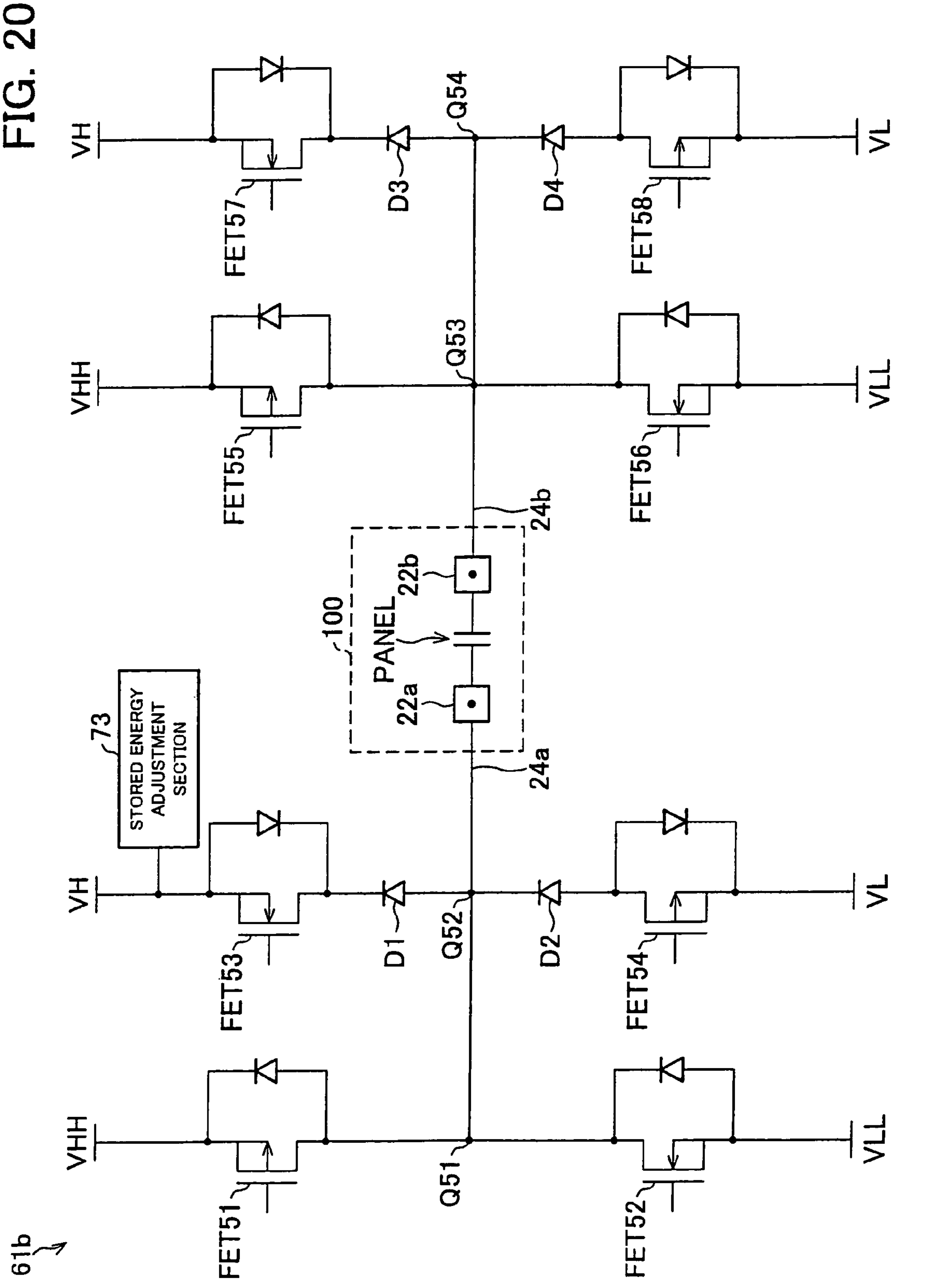
FIG. 20 is a circuit block diagram showing, as an embodiment of the present invention, a second modification example of the pixel charge-discharge circuit of FIG. 10.

FIG. 20 shows an arrangement of a pixel charge-discharge circuit 61*b* arranged so that the three types of voltage sources VHH, VH, and VL of FIG. 10 are positive voltage sources and the one type of voltage source VLL of FIG. 10 is a negative voltage source. The voltage source VHH is a first high voltage source, and the power supple VH is a second high voltage source. The voltage source VLL is a first low voltage source, and the voltage source VL is a second low voltage source. That is, the voltage sources have potentials represented by the following relation: VHH>VH>VL>0>VLL. Further, the voltage source VH is provided with a stored energy adjustment section (stored energy adjusting means) 73. The stored energy adjustment section 73 has the same arrangement as the stored energy adjustment section 2 of FIG. 1. The series circuit 100 is charged and discharged in the same way as in FIG. 10.

Figure 21:
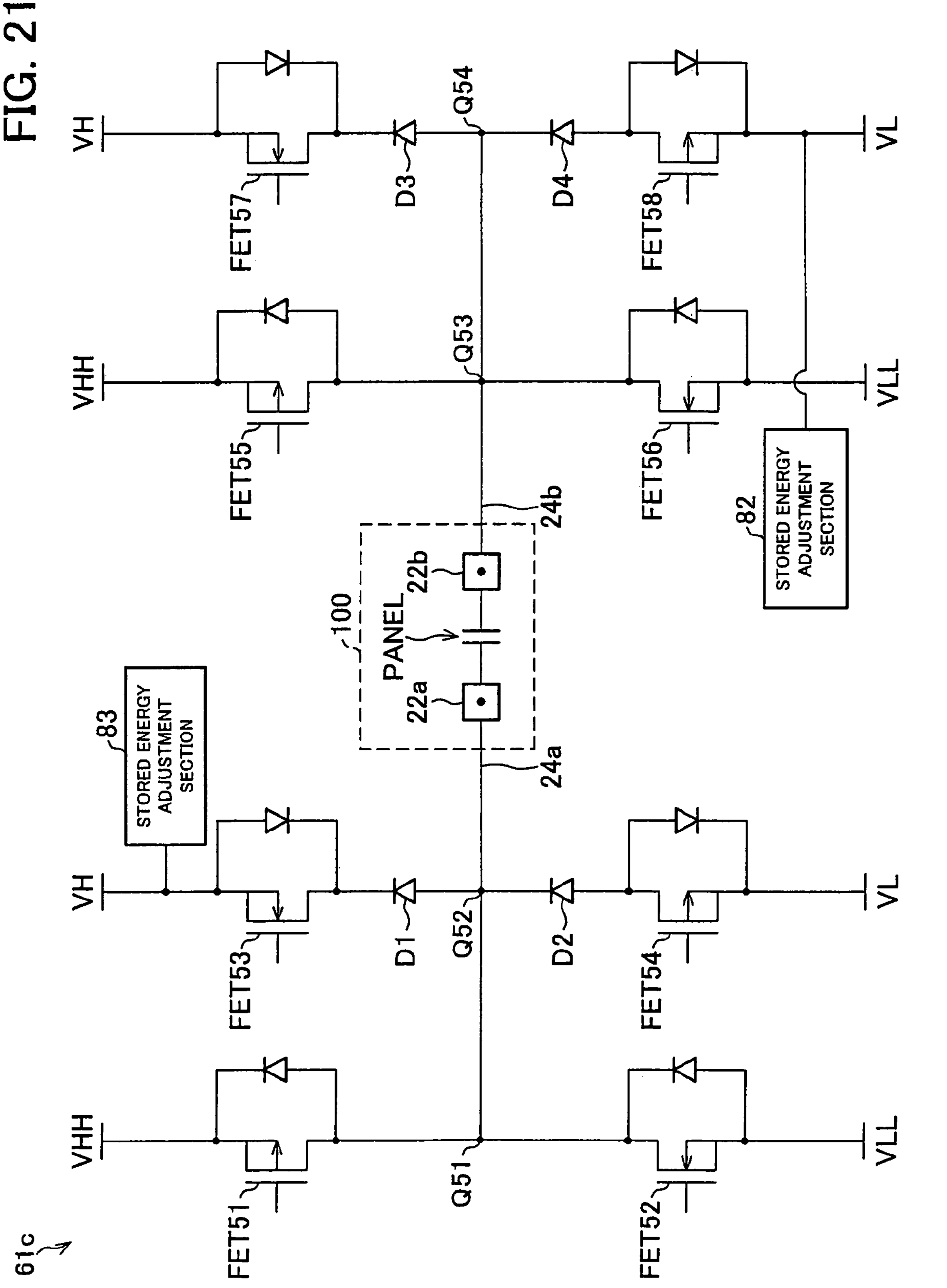
FIG. 21 is a circuit block diagram showing, as an embodiment of the present invention, a third modification example of the pixel charge-discharge circuit of FIG. 10.

FIG. 21 shows an arrangement of a pixel charge-discharge circuit 61c arranged so that the two types of voltage sources VHH and VH of FIG. 10 are positive voltage sources and the two types of voltage sources VL and VLL of FIG. 10 are negative voltage sources. The voltage source VHH is a first high voltage source, and the power supple VH is a second high voltage source. The voltage source VLL is a first low voltage source, and the voltage source VL is a second low voltage source. That is, the voltage sources have potentials represented by the following relation: VHH>VH>0>VL>VLL. Further, the voltage source VL is provided with a stored energy adjustment section (stored energy adjusting means) 82, and the voltage source VH is provided with a stored energy adjustment section (stored energy adjusting means) 83. Each of the stored energy adjustment sections 82 and 83 has the same arrangement as the stored energy adjustment section 20 of FIG. 18. The series circuit 100 is charged and discharged in the same way as in FIG. 10.

Figure 22:
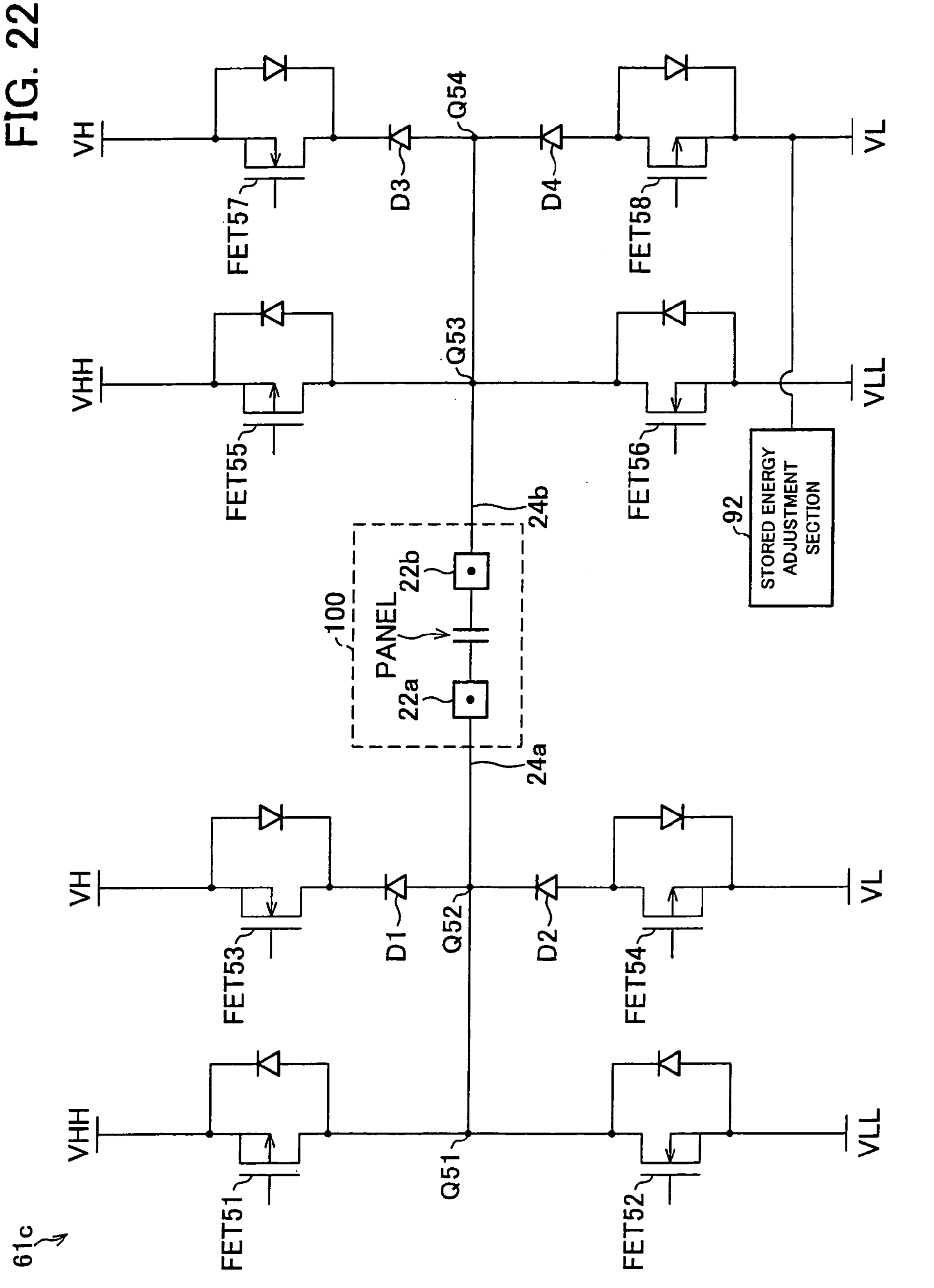
FIG. 22 is a circuit block diagram showing, as an embodiment of the present invention, a fourth modification example of the pixel charge-discharge circuit of FIG. 10.

FIG. 22 shows an arrangement of a pixel charge-discharge circuit 61d arranged so that the one type of voltage source VHH of FIG. 10 is a positive voltage source and the three types of voltage sources VH, VL, and VLL of FIG. 10 are negative voltage sources. The voltage source VHH is a first high voltage source, and the power supple VH is a second high voltage source. The voltage source VLL is a first low voltage source, and the voltage source VL is a second low voltage source. That is, the voltage sources have potentials represented by the following relation: VHH>0>VH>VL>VLL. Further, the voltage source VL is provided with a stored energy adjustment section (stored energy adjusting means) 92. The stored energy adjustment section 92 has the same arrangement as the stored energy adjustment section 20 of FIG. 18. The series circuit 100 is charged and discharged in the same way as in FIG. 10.

Each of the switches of the first and second embodiments can be achieved by using a MOSFET as shown for example in FIG. 10 of the second embodiment. However, the switch can be achieved also by using a TFT, i.e., a MOSFET formed on an insulative substrate such as a glass substrate, as well as by using a MOSFET formed on a semiconductor substrate. Generally, an insulated gate field effect transistor can be used as the switch.

As described above, in order to solve the foregoing problems, the capacitive load charge-discharge device of the present invention is arranged so that the constant voltage sources are the positive voltage sources and come in two types, and the capacitive load is a circuit in which an auxiliary capacitor of a first sub-pixel and a liquid crystal capacitor of the first sub-pixel, an auxiliary capacitor of a second sub-pixel, and a liquid crystal capacitor of the second sub-pixel are serially connected through a counter electrode, the first sub-pixel and the second sub-pixel forming a single pixel of a liquid crystal display element, and the first and second voltage application terminals of the capacitive load are respectively a first auxiliary capacitance wire, which is connected to the auxiliary capacitor of the first sub-pixel so as to be connected to an electrode opposite to the liquid crystal capacitor of the first sub-pixel, and a second auxiliary capacitance wire, which is connected to the auxiliary capacitor of the second sub-pixel so as to be connected to an electrode opposite to the liquid crystal capacitor of the second sub-pixel, and the constant voltage source serving as the low voltage source includes the stored energy adjusting means, and the charging-discharging is performed by alternately switching between the first voltage application terminal connected to the high voltage source and the second voltage application terminal connected to the low voltage source.

According to the foregoing invention, the first pixel and the second pixel form the single pixel of the liquid crystal display element, and the circuit in which the auxiliary capacitor of the first sub-pixel and the liquid crystal capacitor of the first sub-pixel, the auxiliary capacitor of the second sub-pixel, and the liquid crystal capacitor of the second sub-pixel are serially connected through the counter electrode is charged and discharged by alternately connecting each of the first auxiliary capacitance wire and the second auxiliary capacitance wire to the high voltage source and the low voltage source. Moreover, since the high voltage source serving as the positive voltage source includes the stored energy adjusting means, it is possible to stabilize an output potential of the low voltage source serving as the sink-current-flowing voltage source.

This brings about an effect of accurately controlling a potential of each sub-pixel in a binary multi-pixel driving liquid crystal display element which reduces viewing angle dependency of gamma characteristics.

In order to solve the foregoing problems, the capacitive load charge-discharge device of the present invention is arranged so that the constant voltage sources are the negative voltage sources and come in two types, and the capacitive load is a circuit in which an auxiliary capacitor of a first sub-pixel and a liquid crystal capacitor of the first sub-pixel, an auxiliary capacitor of a second sub-pixel, and a liquid crystal capacitor of the second sub-pixel are serially connected through a counter electrode, the first sub-pixel and the second sub-pixel forming a single pixel of a liquid crystal display element, and the first and second voltage application terminals of the capacitive load are respectively a first auxiliary capacitance wire, which is connected to the auxiliary capacitor of the first sub-pixel so as to be connected to an electrode opposite to the liquid crystal capacitor of the first sub-pixel, and a second auxiliary capacitance wire, which is connected to the auxiliary capacitor of the second sub-pixel so as to be connected to an electrode opposite to the liquid crystal capacitor of the second sub-pixel, and the constant voltage source serving as the high voltage source includes the stored energy adjusting means, and the charging-discharging is performed by alternately switching between the first voltage application terminal connected to the high voltage source and the second voltage application terminal connected to the low voltage source.

According to the foregoing invention, the first pixel and the second pixel form the single pixel of the liquid crystal display element, and the circuit in which the auxiliary capacitor of the first sub-pixel and the liquid crystal capacitor of the first sub-pixel, the auxiliary capacitor of the second sub-pixel, and the liquid crystal capacitor of the second sub-pixel are serially connected through the counter electrode is charged and discharged by alternately connecting each of the first auxiliary capacitance wire and the second auxiliary capacitance wire to the high voltage source and the low voltage source. Moreover, since the high voltage source serving as the negative voltage source includes the stored energy adjusting means, it is possible to stabilize an output potential of the high voltage source serving as the source-current-flowing voltage source.

This brings about an effect of accurately controlling a potential of each sub-pixel in a binary multi-pixel driving liquid crystal display element which reduces viewing angle dependency of gamma characteristics.

In order to solve the foregoing problems, the capacitive load charge-discharge device of the present invention is arranged so that the constant voltage sources are the positive voltage sources and come in four types: (i) a constant voltage source which has a highest potential and serves as a first high voltage source, (ii) a constant voltage source which has a second highest potential and serves as a second high voltage source, (iii) a constant voltage source which has a lowest potential and serves as a first low voltage source; and (iv) a constant voltage source which has a second lowest potential and serves as a second low voltage source, and the capacitive load is a circuit in which an auxiliary capacitor of a first sub-pixel and a liquid crystal capacitor of the first sub-pixel, an auxiliary capacitor of a second sub-pixel, and a liquid crystal capacitor of the second sub-pixel are serially connected through a counter electrode, the first sub-pixel and the second sub-pixel forming a single pixel of a liquid crystal display element, and the first and second voltage application terminals of the capacitive load are respectively a first auxiliary capacitance wire, which is connected to the auxiliary capacitor of the first sub-pixel so as to be connected to an electrode opposite to the liquid crystal capacitor of the first sub-pixel, and a second auxiliary capacitance wire, which is connected to the auxiliary capacitor of the second sub-pixel so as to be connected to an electrode opposite to the liquid crystal capacitor of the second sub-pixel, and each of the first low voltage source and the second high voltage source includes the stored energy adjusting means, and the charging-discharging is performed by connecting the first auxiliary capacitance wire and the second auxiliary capacitance wire to the voltage sources in a switching manner so that the first auxiliary capacitance wire is connected to the first high voltage source and the second auxiliary capacitance wire is connected to the first low voltage source in a first period, and the first auxiliary capacitance wire is connected to the second high voltage source and the second auxiliary capacitance wire is connected to the second low voltage source in a second period, and the first auxiliary capacitance wire is connected to the first low voltage source and the second auxiliary capacitance wire is connected to the first high voltage source in a third period, and the first auxiliary capacitance wire is connected to the second low voltage source and the second auxiliary capacitance wire is connected to the second high voltage source in a fourth period.

According to the foregoing invention, the first pixel and the second pixel form the single pixel of the liquid crystal display element, and the circuit in which the auxiliary capacitor of the first sub-pixel and the liquid crystal capacitor of the first sub-pixel, the auxiliary capacitor of the second sub-pixel, and the liquid crystal capacitor of the second sub-pixel are serially connected through the counter electrode is charged and discharged by alternately connecting each of the first auxiliary capacitance wire and the second auxiliary capacitance wire to the first and second high voltage sources and the first and second low voltage sources from the first period to the fourth period. Moreover, since each of the first low voltage source and the second high voltage source, both of which serve as the positive voltage sources, includes the stored energy adjusting means, it is possible to stabilize an output potential of each of the first low voltage source and the second high voltage source, both of which serve as the sink-current-flowing voltage sources.

This brings about an effect of accurately controlling a potential of each sub-pixel in a quarternary multi-pixel driving liquid crystal display element which reduces viewing angle dependency of gamma characteristics.

In order to solve the foregoing problems, the capacitive load charge-discharge device of the present invention is arranged so that the constant voltage sources are the negative voltage sources and come in four types: (i) a constant voltage source which has a highest potential and serves as a first high voltage source, (ii) a constant voltage source which has a second highest potential and serves as a second high voltage source, (iii) a constant voltage source which has a lowest potential and serves as a first low voltage source; and (iv) a constant voltage source which has a second lowest potential and serves as a second low voltage source, and the capacitive load is a circuit in which an auxiliary capacitor of a first sub-pixel and a liquid crystal capacitor of the first sub-pixel, an auxiliary capacitor of a second sub-pixel, and a liquid crystal capacitor of the second sub-pixel are serially connected through a counter electrode, the first sub-pixel and the second sub-pixel forming a single pixel of a liquid crystal display element, and the first and second voltage application terminals of the capacitive load are respectively a first auxiliary capacitance wire, which is connected to the auxiliary capacitor of the first sub-pixel so as to be connected to an electrode opposite to the liquid crystal capacitor of the first sub-pixel, and a second auxiliary capacitance wire, which is connected to the auxiliary capacitor of the second sub-pixel so as to be connected to an electrode opposite to the liquid crystal capacitor of the second sub-pixel, and each of the first high voltage source and the second low voltage source includes the stored energy adjusting means, and the charging-discharging is performed by connecting the first auxiliary capacitance wire and the second auxiliary capacitance wire to the voltage sources in a switching manner so that the first auxiliary capacitance wire is connected to the first high voltage source and the second auxiliary capacitance wire is connected to the first low voltage source in a first period, and the first auxiliary capacitance wire is connected to the second high voltage source and the second auxiliary capacitance wire is connected to the second low voltage source in a second period, and the first auxiliary capacitance wire is connected to the first low voltage source and the second auxiliary capacitance wire is connected to the first high voltage source in a third period, and the first auxiliary capacitance wire is connected to the second low voltage source and the second auxiliary capacitance wire is connected to the second high voltage source in a fourth period.

According to the foregoing invention, the first pixel and the second pixel form the single pixel of the liquid crystal display element, and the circuit in which the auxiliary capacitor of the first sub-pixel and the liquid crystal capacitor of the first sub-pixel, the auxiliary capacitor of the second sub-pixel, and the liquid crystal capacitor of the second sub-pixel are serially connected through the counter electrode is charged and discharged by alternately connecting each of the first auxiliary capacitance wire and the second auxiliary capacitance wire to the first and second high voltage sources and the first and second low voltage sources from the first period to the fourth period. Moreover, since each of the first high voltage source and the second low voltage source, both of which serve as the negative voltage sources, includes the stored energy adjusting means, it is possible to stabilize an output potential of each of the first high voltage source and the second low voltage source, both of which serve as the source-current-flowing voltage sources.

This brings about an effect of accurately controlling a potential of each sub-pixel in a quarternary multi-pixel driving liquid crystal display element which reduces viewing angle dependency of gamma characteristics.

In order to solve the foregoing problems, the capacitive load charge-discharge device of the present invention is arranged so that the constant voltage sources come in three types of positive voltage sources and one type of negative voltage source: (i) a constant voltage source which has a highest potential and serves as a first high voltage source, (ii) a constant voltage source which has a second highest potential and serves as a second high voltage source, (iii) a constant voltage source which has a lowest potential and serves as a first low voltage source; and (iv) a constant voltage source which has a second lowest potential and serves as a second low voltage source, and the capacitive load is a circuit in which an auxiliary capacitor of a first sub-pixel and a liquid crystal capacitor of the first sub-pixel, an auxiliary capacitor of a second sub-pixel, and a liquid crystal capacitor of the second sub-pixel are serially connected through a counter electrode, the first sub-pixel and the second sub-pixel forming a single pixel of a liquid crystal display element, and the first and second voltage application terminals of the capacitive load are respectively a first auxiliary capacitance wire, which is connected to the auxiliary capacitor of the first sub-pixel so as to be connected to an electrode opposite to the liquid crystal capacitor of the first sub-pixel, and a second auxiliary capacitance wire, which is connected to the auxiliary capacitor of the second sub-pixel so as to be connected to an electrode opposite to the liquid crystal capacitor of the second sub-pixel, and the second high voltage source includes the stored energy adjusting means, and the charging-discharging is performed by connecting the first auxiliary capacitance wire and the second auxiliary capacitance wire to the voltage sources in a switching manner so that the first auxiliary capacitance wire is connected to the first high voltage source and the second auxiliary capacitance wire is connected to the first low voltage source in a first period, and the first auxiliary capacitance wire is connected to the second high voltage source and the second auxiliary capacitance wire is connected to the second low voltage source in a second period, and the first auxiliary capacitance wire is connected to the first low voltage source and the second auxiliary capacitance wire is connected to the first high voltage source in a third period, and the first auxiliary capacitance wire is connected to the second low voltage source and the second auxiliary capacitance wire is connected to the second high voltage source in a fourth period.

According to the foregoing invention, the first pixel and the second pixel form the single pixel of the liquid crystal display element, and the circuit in which the auxiliary capacitor of the first sub-pixel and the liquid crystal capacitor of the first sub-pixel, the auxiliary capacitor of the second sub-pixel, and the liquid crystal capacitor of the second sub-pixel are serially connected through the counter electrode is charged and discharged by alternately connecting each of the first auxiliary capacitance wire and the second auxiliary capacitance wire to the first and second high voltage sources and the first and second low voltage sources from the first period to the fourth period. Moreover, since the second high voltage source serving as the positive voltage source includes the stored energy adjusting means, it is possible to stabilize an output potential of the second high voltage source serving as the sink-current-flowing voltage source.

This brings about an effect of accurately controlling a potential of each sub-pixel in a quarternary multi-pixel driving liquid crystal display element that reduces viewing angle dependency of gamma characteristics.

In order to solve the foregoing problems, the capacitive load charge-discharge device of the present invention is arranged so that the constant voltage sources come in two types of positive voltage sources and two types of negative voltage sources: (i) a constant voltage source which has a highest potential and serves as a first high voltage source, (ii) a constant voltage source which has a second highest potential and serves as a second high voltage source, (iii) a constant voltage source which has a lowest potential and serves as a first low voltage source; and (iv) a constant voltage source which has a second lowest potential and serves as a second low voltage source, and the capacitive load is a circuit in which an auxiliary capacitor of a first sub-pixel and a liquid crystal capacitor of the first sub-pixel, an auxiliary capacitor of a second sub-pixel, and a liquid crystal capacitor of the second sub-pixel are serially connected through a counter electrode, the first sub-pixel and the second sub-pixel forming a single pixel of a liquid crystal display element, and the first and second voltage application terminals of the capacitive load respectively are a first auxiliary capacitance wire, which is connected to the auxiliary capacitor of the first sub-pixel so as to be connected to an electrode opposite to the liquid crystal capacitor of the first sub-pixel, and a second auxiliary capacitance wire, which is connected to the auxiliary capacitor of the second sub-pixel so as to be connected to an electrode opposite to the liquid crystal capacitor of the second sub-pixel, and each of the second high voltage source and the second low voltage source includes the stored energy adjusting means, and the charging-discharging is performed by connecting the first auxiliary capacitance wire and the second auxiliary capacitance wire to the voltage sources in a switching manner so that the first auxiliary capacitance wire is connected to the first high voltage source and the second auxiliary capacitance wire is connected to the first low voltage source in a first period, and the first auxiliary capacitance wire is connected to the second high voltage source and the second auxiliary capacitance wire is connected to the second low voltage source in a second period, and the first auxiliary capacitance wire is connected to the first low voltage source and the second auxiliary capacitance wire is connected to the first high voltage source in a third period, and the first auxiliary capacitance wire is connected to the second low voltage source and the second auxiliary capacitance wire is connected to the second high voltage source in a fourth period.

According to the foregoing invention, the first pixel and the second pixel form the single pixel of the liquid crystal display element, and the circuit in which the auxiliary capacitor of the first sub-pixel and the liquid crystal capacitor of the first sub-pixel, the auxiliary capacitor of the second sub-pixel, and the liquid crystal capacitor of the second sub-pixel are serially connected through the counter electrode is charged and discharged by alternately connecting each of the first auxiliary capacitance wire and the second auxiliary capacitance wire to the first and second high voltage sources and the first and second low voltage sources from the first period to the fourth period. Moreover, since each of the second high voltage source serving as the positive voltage source and the second low voltage source serving as the negative voltage source includes the stored energy adjusting means, it is possible to stabilize an output potential of each of the second high voltage source serving as the sink-current-flowing voltage source and the second low voltage source serving as the source-current-flowing voltage source.

This brings about an effect of accurately controlling a potential of each sub-pixel in a quarternary multi-pixel driving liquid crystal display element which reduces viewing angle dependency of gamma characteristics.

In order to solve the foregoing problems, the capacitive load charge-discharge device of the present invention is arranged so that the constant voltage sources come in one type of a positive voltage source and three types of negative voltage sources: (i) a constant voltage source which has a highest potential and serves as a first high voltage source, (ii) a constant voltage source which has a second highest potential and serves as a second high voltage source, (iii) a constant voltage source which has a lowest potential and serves as a first low voltage source; and (iv) a constant voltage source which has a second lowest potential and serves as a second low voltage source, and the capacitive load is a circuit in which an auxiliary capacitor of a first sub-pixel and a liquid crystal capacitor of the first sub-pixel, an auxiliary capacitor of a second sub-pixel, and a liquid crystal capacitor of the second sub-pixel are serially connected through a counter electrode, the first sub-pixel and the second sub-pixel forming a single pixel of a liquid crystal display element, and the first and second voltage application terminals of the capacitive load are a first auxiliary capacitance wire, which is connected to the auxiliary capacitor of the first sub-pixel so as to be connected to an electrode opposite to the liquid crystal capacitor of the first sub-pixel, and a second auxiliary capacitance wire, which is connected to the auxiliary capacitor of the second sub-pixel so as to be connected to an electrode opposite to the liquid crystal capacitor of the second sub-pixel, and the second low voltage source includes the stored energy adjusting means, and the charging-discharging is performed by connecting the first auxiliary capacitance wire and the second auxiliary capacitance wire to the voltage sources in a switching manner so that the first auxiliary capacitance wire is connected to the first high voltage source and the second auxiliary capacitance wire is connected to the first low voltage source in a first period, and the first auxiliary capacitance wire is connected to the second high voltage source and the second auxiliary capacitance wire is connected to the second low voltage source in a second period, and the first auxiliary capacitance wire is connected to the first low voltage source and the second auxiliary capacitance wire is connected to the first high voltage source in a third period, and the first auxiliary capacitance wire is connected to the second low voltage source and the second auxiliary capacitance wire is connected to the second high voltage source in a fourth period.

According to the foregoing invention, the first pixel and the second pixel form the single pixel of the liquid crystal display element, and the circuit in which the auxiliary capacitor of the first sub-pixel and the liquid crystal capacitor of the first sub-pixel, the auxiliary capacitor of the second sub-pixel, and the liquid crystal capacitor of the second sub-pixel are serially connected through the counter electrode is charged and discharged by alternately connecting each of the first auxiliary capacitance wire and the second auxiliary capacitance wire to the first and second high voltage sources and the first and second low voltage sources from the first period to the fourth period. Moreover, since the second low voltage source serving as the negative voltage source includes the stored energy adjusting means, it is possible to stabilize an output potential of the second low voltage source serving as the source-current-flowing voltage source.

This brings about an effect of accurately controlling a potential of each sub-pixel in a quarternary multi-pixel driving liquid crystal display element which reduces viewing angle dependency of gamma characteristics.

In order to solve the foregoing problems, the capacitive load charge-discharge device of the present invention is arranged so that the constant voltage sources include first to nth high voltage sources and first to nth low voltage sources, and the capacitive load is a circuit in which an auxiliary capacitor of a first sub-pixel and a liquid crystal capacitor of the first sub-pixel, an auxiliary capacitor of a second sub-pixel, and a liquid crystal capacitor of the second sub-pixel are serially connected through a counter electrode, the first sub-pixel and the second sub-pixel forming a single pixel of a liquid crystal display element, and the first and second voltage application terminals of the capacitive load are a first auxiliary capacitance wire, which is connected to the auxiliary capacitor of the first sub-pixel so as to be connected to an electrode opposite to the liquid crystal capacitor of the first sub-pixel, and a second auxiliary capacitance wire, which is connected to the auxiliary capacitor of the second sub-pixel so as to be connected to an electrode opposite to the liquid crystal capacitor of the second sub-pixel, and the charging-discharging is performed by connecting the first auxiliary capacitance wire and the second auxiliary capacitance wire to the voltage sources in the switching manner so that the second auxiliary capacitance wire is connected to a kth (k=1~n) low voltage source in a period during which the first auxiliary capacitance wire is connected to a kth high voltage source, and the second auxiliary capacitance wire is connected to the kth (k=1~n) high voltage source in a period during which the first auxiliary capacitance wire is connected to the kth low voltage source.

According to the foregoing invention, the first pixel and the second pixel form the single pixel of the liquid crystal display element, and the circuit in which the auxiliary capacitor of the first sub-pixel and the liquid crystal capacitor of the first sub-pixel, the auxiliary capacitor of the second sub-pixel, and the liquid crystal capacitor of the second sub-pixel are serially connected through the counter electrode is charged and discharged by connecting one of the first auxiliary capacitance wire and the second auxiliary capacitance wire to the k-th high voltage source and connecting the other to the k-th low voltage source. Moreover, when there is a voltage source serving as both a positive voltage source and a sink-current-flowing voltage source and there is a voltage source serving as both a negative voltage source and a source-current-flowing voltage source according to an order in which the first auxiliary capacitance wire and the second auxiliary capacitance wire are connected to the constant voltage sources, each of the voltage sources is provided with the stored energy adjusting means. In this way, it is possible to stabilize an output potential of each of these voltage sources.

This brings about an effect of accurately controlling a potential of each sub-pixel in a 2n-value multi-pixel driving liquid crystal display element which reduces viewing angle dependency of gamma characteristics.

In order to solve the foregoing problems, the capacitive load charge-discharge device of the present invention is a capacitive load charge-discharge device being provided with a MOSFET for connecting and disconnecting each of the first auxiliary capacitance wire and the second auxiliary capacitance wire to and from each of the constant voltage sources, the capacitive load charge-discharge device including: a diode inserted between the MOSFET and the first and second auxiliary capacitance wires so as to be positioned in a reverse direction from a high-potential sink-current-flowing voltage source to the first or second auxiliary capacitance wire, the MOSFET connecting and disconnecting the high-potential sink-current-flowing voltage source, which is the constant voltage source serving as both the high voltage source and the sink-current-flowing voltage source; and a diode inserted between the MOSFET and the first and second auxiliary capacitance wires so as to be positioned in a reverse direction from the first or second auxiliary capacitance wire to a low-potential source-current-flowing voltage source, the MOSFET connecting and disconnecting the low-potential source-current-flowing voltage source, which is the constant voltage source serving as both the low voltage source and the source-current-flowing voltage source.

According to the foregoing invention, in each period during which the capacitive load is charged and discharged, the diodes prevent a current from flowing from an inactive voltage source (meaning a voltage source which is not used for charging and discharging) through a parasitic diode of the MOSFET into a voltage source having a lower potential and prevent the current from flowing from a voltage source having a higher potential through the parasitic diode of the MOSFET into the inactive voltage source. This brings about an effect of accurately controlling a potential of each of the first and second sub-pixels.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A capacitive load charge-discharge device, comprising:

plural types of constant voltage sources having different output potentials; and a capacitive load whose charging-discharging is performed by the plural types of constant voltage sources, the capacitive load charge-discharge device performing the charging-discharging by connecting one of the constant voltage sources as a high voltage source to a first voltage application terminal of the capacitive load and connecting one of the constant voltage sources as a low voltage source to a second voltage application terminal of the capacitive load, wherein:

the constant voltage sources serve as at least either positive voltage sources serving as sink-current-flowing voltage sources or negative voltage sources serving as source-current-flowing voltage sources, and when the constant voltage sources serve as the sink-current-flowing voltage sources, each of the sink-current-flowing voltage sources includes stored energy adjusting means which at least discharges energy stored therein so that the energy leans toward a negative side, and when the constant voltage sources serve as the source-current-flowing voltage sources, each of the source-current-flowing voltage sources includes the stored energy adjusting means which at least replenishes the energy stored therein so that the energy leans toward a positive side.

2. The capacitive load charge-discharge device according to claim 1, wherein:

the constant voltage sources are the positive voltage sources and come in two types, and the capacitive load is a circuit in which an auxiliary capacitor of a first sub-pixel, a liquid crystal capacitor of the first sub-pixel, an auxiliary capacitor of a second sub-pixel, and a liquid crystal capacitor of the second sub-pixel are serially connected through a counter electrode, the first sub-pixel and the second sub-pixel forming a single pixel of a liquid crystal display element, and the first and second voltage application terminals of the capacitive load are respectively a first auxiliary capacitance wire, which is connected to the auxiliary capacitor of the first sub-pixel so as to be connected to an electrode opposite to the liquid crystal capacitor of the first sub-pixel, and a second auxiliary capacitance wire, which is connected to the auxiliary capacitor of the second sub-pixel so as to be connected to an electrode opposite to the liquid crystal capacitor of the second sub-pixel, and the constant voltage source serving as the low voltage source includes the stored energy adjusting means, and the charging-discharging is performed by alternately switching between the first voltage application terminal connected to the high voltage source and the second voltage application terminal connected to the low voltage source.

3. The capacitive load charge-discharge device according to claim 1, wherein:

the constant voltage sources are the negative voltage sources and come in two types, and the capacitive load is a circuit in which an auxiliary capacitor of a first sub-pixel, a liquid crystal capacitor of the first sub-pixel, an auxiliary capacitor of a second sub-pixel, and a liquid crystal capacitor of the second sub-pixel are serially connected through a counter electrode, the first sub-pixel and the second sub-pixel forming a single pixel of a liquid crystal display element, and the first and second voltage application terminals of the capacitive load are respectively a first auxiliary capacitance wire, which is connected to the auxiliary capacitor of the first sub-pixel so as to be connected to an electrode opposite to the liquid crystal capacitor of the first sub-pixel, and a second auxiliary capacitance wire, which is connected to the auxiliary capacitor of the second sub-pixel so as to be connected to an electrode opposite to the liquid crystal capacitor of the second sub-pixel, and the constant voltage source serving as the high voltage source includes the stored energy adjusting means, and the charging-discharging is performed by alternately switching between the first voltage application terminal connected to the high voltage source and the second voltage application terminal connected to the low voltage source.

4. The capacitive load charge-discharge device according to claim 1, wherein:

the constant voltage sources are the positive voltage sources and come in four types: (i) a constant voltage source which has a highest potential and serves as a first high voltage source, (ii) a constant voltage source which has a second highest potential and serves as a second high voltage source, (iii) a constant voltage source which has a lowest potential and serves as a first low voltage source; and (iv) a constant voltage source which has a second lowest potential and serves as a second low voltage source, and the capacitive load is a circuit in which an auxiliary capacitor of a first sub-pixel, a liquid crystal capacitor of the first sub-pixel, an auxiliary capacitor of a second sub-pixel, and a liquid crystal capacitor of the second sub-pixel are serially connected through a counter electrode, the first sub-pixel and the second sub-pixel forming a single pixel of a liquid crystal display element, and the first and second voltage application terminals of the capacitive load are respectively a first auxiliary capacitance wire, which is connected to the auxiliary capacitor of the first sub-pixel so as to be connected to an electrode opposite to the liquid crystal capacitor of the first sub-pixel, and a second auxiliary capacitance wire, which is connected to the auxiliary capacitor of the second sub-pixel so as to be connected to an electrode opposite to the liquid crystal capacitor of the second sub-pixel, and each of the first low voltage source and the second high voltage source includes the stored energy adjusting means, and the charging-discharging is performed by connecting the first auxiliary capacitance wire and the second auxiliary capacitance wire to the voltage sources in a switching manner so that the first auxiliary capacitance wire is connected to the first high voltage source and the second auxiliary capacitance wire is connected to the first low voltage source in a first period, and the first auxiliary capacitance wire is connected to the second high voltage source and the second auxiliary capacitance wire is connected to the second low voltage source in a second period, and the first auxiliary capacitance wire is connected to the first low voltage source and the second auxiliary capacitance wire is connected to the first high voltage source in a third period, and the first auxiliary capacitance wire is connected to the second low voltage source and the second auxiliary capacitance wire is connected to the second high voltage source in a fourth period.

5. The capacitive load charge-discharge device according to claim 1, wherein:

the constant voltage sources are the negative voltage sources and come in four types: (i) a constant voltage source which has a highest potential and serves as a first high voltage source, (ii) a constant voltage source which has a second highest potential and serves as a second high voltage source, (iii) a constant voltage source which has a lowest potential and serves as a first low voltage source; and (iv) a constant voltage source which has a second lowest potential and serves as a second low voltage source, and the capacitive load is a circuit in which an auxiliary capacitor of a first sub-pixel, a liquid crystal capacitor of the first sub-pixel, an auxiliary capacitor of a second sub-pixel, and a liquid crystal capacitor of the second sub-pixel are serially connected through a counter electrode, the first sub-pixel and the second sub-pixel forming a single pixel of a liquid crystal display element, and the first and second voltage application terminals of the capacitive load are respectively a first auxiliary capacitance wire, which is connected to the auxiliary capacitor of the first sub-pixel so as to be connected to an electrode opposite to the liquid crystal capacitor of the first sub-pixel, and a second auxiliary capacitance wire, which is connected to the auxiliary capacitor of the second sub-pixel so as to be connected to an electrode opposite to the liquid crystal capacitor of the second sub-pixel, and each of the first high voltage source and the second low voltage source includes the stored energy adjusting means, and the charging-discharging is performed by connecting the first auxiliary capacitance wire and the second auxiliary capacitance wire to the voltage sources in a switching manner so that the first auxiliary capacitance wire is connected to the first high voltage source and the second auxiliary capacitance wire is connected to the first low voltage source in a first period, and the first auxiliary capacitance wire is connected to the second high voltage source and the second auxiliary capacitance wire is connected to the second low voltage source in a second period, and the first auxiliary capacitance wire is connected to the first low voltage source and the second auxiliary capacitance wire is connected to the first high voltage source in a third period, and the first auxiliary capacitance wire is connected to the second low voltage source and the second auxiliary capacitance wire is connected to the second high voltage source in a fourth period.

6. The capacitive load charge-discharge device according to claim 1, wherein:

the constant voltage sources come in three types of positive voltage sources and one type of a negative voltage source: (i) a constant voltage source which has a highest potential and serves as a first high voltage source, (ii) a constant voltage source which has a second highest potential and serves as a second high voltage source, (iii) a constant voltage source which has a lowest potential and serves as a first low voltage source; and (iv) a constant voltage source which has a second lowest potential and serves as a second low voltage source, and the capacitive load is a circuit in which an auxiliary capacitor of a first sub-pixel, a liquid crystal capacitor of the first sub-pixel, an auxiliary capacitor of a second sub-pixel, and a liquid crystal capacitor of the second sub-pixel are serially connected through a counter electrode, the first sub-pixel and the second sub-pixel forming a single pixel of a liquid crystal display element, and the first and second voltage application terminals of the capacitive load are respectively a first auxiliary capacitance wire, which is connected to the auxiliary capacitor of the first sub-pixel so as to be connected to an electrode opposite to the liquid crystal capacitor of the first sub-pixel, and a second auxiliary capacitance wire, which is connected to the auxiliary capacitor of the second sub-pixel so as to be connected to an electrode opposite to the liquid crystal capacitor of the second sub-pixel, and the second high voltage source includes the stored energy adjusting means, and the charging-discharging is performed by connecting the first auxiliary capacitance wire and the second auxiliary capacitance wire to the voltage sources in a switching manner so that the first auxiliary capacitance wire is connected to the first high voltage source and the second auxiliary capacitance wire is connected to the first low voltage source in a first period, and the first auxiliary capacitance wire is connected to the second high voltage source and the second auxiliary capacitance wire is connected to the second low voltage source in a second period, and the first auxiliary capacitance wire is connected to the first low voltage source and the second auxiliary capacitance wire is connected to the first high voltage source in a third period, and the first auxiliary capacitance wire is connected to the second low voltage source and the second auxiliary capacitance wire is connected to the second high voltage source in a fourth period.

7. The capacitive load charge-discharge device according to claim 1, wherein:

the constant voltage sources come in two types of positive voltage sources and two types of negative voltage sources: (i) a constant voltage source which has a highest potential and serves as a first high voltage source, (ii) a constant voltage source which has a second highest potential and serves as a second high voltage source, (iii) a constant voltage source which has a lowest potential and serves as a first low voltage source; and (iv) a constant voltage source which has a second lowest potential and serves as a second low voltage source, and the capacitive load is a circuit in which an auxiliary capacitor of a first sub-pixel, a liquid crystal capacitor of the first sub-pixel, an auxiliary capacitor of a second sub-pixel, and a liquid crystal capacitor of the second sub-pixel are serially connected through a counter electrode, the first sub-pixel and the second sub-pixel forming a single pixel of a liquid crystal display element, and the first and second voltage application terminals of the capacitive load are respectively a first auxiliary capacitance wire, which is connected to the auxiliary capacitor of the first sub-pixel so as to be connected to an electrode opposite to the liquid crystal capacitor of the first sub-pixel, and a second auxiliary capacitance wire, which is connected to the auxiliary capacitor of the second sub-pixel so as to be connected to an electrode opposite to the liquid crystal capacitor of the second sub-pixel, and each of the second high voltage source and the second low voltage source includes the stored energy adjusting means, and the charging-discharging is performed by connecting the first auxiliary capacitance wire and the second auxiliary capacitance wire to the voltage sources in a switching manner so that the first auxiliary capacitance wire is connected to the first high voltage source and the second auxiliary capacitance wire is connected to the first low voltage source in a first period, and the first auxiliary capacitance wire is connected to the second high voltage source and the second auxiliary capacitance wire is connected to the second low voltage source in a second period, and the first auxiliary capacitance wire is connected to the first low voltage source and the second auxiliary capacitance wire is connected to the first high voltage source in a third period, and the first auxiliary capacitance wire is connected to the second low voltage source and the second auxiliary capacitance wire is connected to the second high voltage source in a fourth period.

8. The capacitive load charge-discharge device according to claim 1, wherein:

the constant voltage sources come in one type of a positive voltage source and three types of negative voltage sources: (i) a constant voltage source which has a highest potential and serves as a first high voltage source, (ii) a constant voltage source which has a second highest potential and serves as a second high voltage source, (iii) a constant voltage source which has a lowest potential and serves as a first low voltage source; and (iv) a constant voltage source which has a second lowest potential and serves as a second low voltage source, and the capacitive load is a circuit in which an auxiliary capacitor of a first sub-pixel, a liquid crystal capacitor of the first sub-pixel, an auxiliary capacitor of a second sub-pixel, and a liquid crystal capacitor of the second sub-pixel are serially connected through a counter electrode, the first sub-pixel and the second sub-pixel forming a single pixel of a liquid crystal display element, and the first and second voltage application terminals of the capacitive load are respectively a first auxiliary capacitance wire, which is connected to the auxiliary capacitor of the first sub-pixel so as to be connected to an electrode opposite to the liquid crystal capacitor of the first sub-pixel, and a second auxiliary capacitance wire, which is connected to the auxiliary capacitor of the second sub-pixel so as to be connected to an electrode opposite to the liquid crystal capacitor of the second sub-pixel, and the second low voltage source includes the stored energy adjusting means, and the charging-discharging is performed by connecting the first auxiliary capacitance wire and the second auxiliary capacitance wire to the voltage sources in a switching manner so that the first auxiliary capacitance wire is connected to the first high voltage source and the second auxiliary capacitance wire is connected to the first low voltage source in a first period, and the first auxiliary capacitance wire is connected to the second high voltage source and the second auxiliary capacitance wire is connected to the second low voltage source in a second period, and the first auxiliary capacitance wire is connected to the first low voltage source and the second auxiliary capacitance wire is connected to the first high voltage source in a third period, and the first auxiliary capacitance wire is connected to the second low voltage source and the second auxiliary capacitance wire is connected to the second high voltage source in a fourth period.

9. The capacitive load charge-discharge device according to claim 1, wherein:

the constant voltage sources include first to n-th high voltage sources and first to n-th low voltage sources, and the capacitive load is a circuit in which an auxiliary capacitor of a first sub-pixel, a liquid crystal capacitor of the first sub-pixel, an auxiliary capacitor of a second sub-pixel, and a liquid crystal capacitor of the second sub-pixel are serially connected through a counter electrode, the first sub-pixel and the second sub-pixel forming a single pixel of a liquid crystal display element, and the first and second voltage application terminals of the capacitive load are respectively a first auxiliary capacitance wire, which is connected to the auxiliary capacitor of the first sub-pixel so as to be connected to an electrode opposite to the liquid crystal capacitor of the first sub-pixel, and a second auxiliary capacitance wire, which is connected to the auxiliary capacitor of the second sub-pixel so as to be connected to an electrode opposite to the liquid crystal capacitor of the second sub-pixel, and the charging-discharging is performed by connecting the first auxiliary capacitance wire and the second auxiliary capacitance wire to the voltage sources in the switching manner so that the second auxiliary capacitance wire is connected to a k-th (k=1~n) low voltage source in a period during which the first auxiliary capacitance wire is connected to a k-th high voltage source, and the second auxiliary capacitance wire is connected to the k-th (k=1~n) high voltage source in a period during which the first auxiliary capacitance wire is connected to the k-th low voltage source.

10. The capacitive load charge-discharge device according to claim 9, being provided with a MOSFET for connecting and disconnecting each of the first auxiliary capacitance wire and the second auxiliary capacitance wire to and from each of the constant voltage sources, the capacitive load charge-discharge device comprising:

a diode inserted between the MOSFET and the first and second auxiliary capacitance wires so as to be positioned in a reverse direction from a high-potential sink-current-flowing voltage source to the first or second auxiliary capacitance wire, the MOSFET connecting and disconnecting the high-potential sink-current-flowing voltage source, which is the constant voltage source serving as both the high voltage source and the sink-current-flowing voltage source; and a diode inserted between the MOSFET and the first and second auxiliary capacitance wires so as to be positioned in a reverse direction from the first or second auxiliary capacitance wire to a low-potential source-current-flowing voltage source, the MOSFET connecting and disconnecting the low-potential source-current-flowing voltage source, which is the constant voltage source serving as both the low voltage source and the source-current-flowing voltage source.

11. A liquid crystal display device, comprising:

plural types of constant voltage sources having different output potentials;

a capacitive load including a circuit in which an auxiliary capacitor of a first sub-pixel, a liquid crystal capacitor of the first sub-pixel, an auxiliary capacitor of a second sub-pixel, and a liquid crystal capacitor of the second sub-pixel are serially connected through a counter electrode, charging-discharging of the capacitive load being performed by the plural types of constant voltage sources, the first sub-pixel and the second sub-pixel forming a single pixel of a liquid crystal display element; and a capacitive load charge-discharge device performing the charging-discharging by connecting one of the constant voltage sources as a high voltage source to a first voltage application terminal of the capacitive load and connecting one of the constant voltage sources as a low voltage source to a second voltage application terminal of the capacitive load, wherein:

the capacitive load charge-discharge device includes the voltage sources which serve as at least either positive voltage sources serving as sink-current-flowing voltage sources or negative voltage sources serving as source-current-flowing voltage sources, and when the constant voltage sources serve as the sink-current-flowing voltage sources, each of the sink-current-flowing voltage sources includes stored energy adjusting means which at least discharges energy stored therein so that the energy leans toward a negative side, and when the constant voltage sources serve as the source-current-flowing voltage sources, each of the source-current-flowing voltage sources includes the stored energy adjusting means which at least replenishes the energy stored therein so that the energy leans toward a positive side.

* * * * *